US006284017B1

(12) United States Patent
Kamei et al.

(10) Patent No.: US 6,284,017 B1
(45) Date of Patent: Sep. 4, 2001

(54) METHOD AND FACILITY FOR PRODUCING REDUCED IRON

(75) Inventors: Yasuo Kamei, Narashino; Takazo Kawaguchi, Chiba; Hideyuki Yamaoka, Ibaraki; Yoshihisa Nakamura, Takatsuki, all of (JP)

(73) Assignee: Sumitomo Metal Industries, Ltd., Osaka (JP)

( * ) Notice: Subject to any disclaimer, the term of this patent is extended or adjusted under 35 U.S.C. 154(b) by 0 days.

(21) Appl. No.: 09/442,037

(22) Filed: Nov. 17, 1999

Related U.S. Application Data

(62) Division of application No. 09/112,359, filed as application No. PCT/JP97/04091 on Nov. 10, 1997, now Pat. No. 6,015,527.

(30) Foreign Application Priority Data

Nov. 11, 1996 (JP) .................................................. 8-314316
Dec. 10, 1996 (JP) .................................................. 8-329950

(51) Int. Cl.$^7$ ..................................................... C21B 11/00
(52) U.S. Cl. ............................................... 75/484; 75/503
(58) Field of Search ......................................... 75/484, 503

(56) References Cited

U.S. PATENT DOCUMENTS

| 3,443,931 | 5/1969 | Beggs et al. . |
| 3,667,746 | 6/1972 | Makarov et al. . |
| 3,988,012 | 10/1976 | Jemal . |
| 5,567,224 | 10/1996 | Kundrat . |
| 5,637,133 | * 6/1997 | Munnix et al. ............... 75/484 |
| 5,730,775 | * 3/1998 | Meissner et al. ............. 75/484 |
| 5,972,066 | * 10/1999 | Lehtinen ...................... 75/484 |

FOREIGN PATENT DOCUMENTS

| 52-91721 | 8/1977 | (JP) . |
| 63-216908 | 9/1988 | (JP) . |
| 1-147009 | 6/1989 | (JP) . |
| 3-60883 | 9/1991 | (JP) . |
| 7-238307 | 9/1995 | (JP) . |

* cited by examiner

Primary Examiner—Scott Kastler
(74) Attorney, Agent, or Firm—Armstrong, Westerman, Hattori, McLeland & Naughton LLP

(57) ABSTRACT

In the method of producing reduced iron according to the invention, fine iron oxides and powdery solid reductants are mixed, compacted into sheet-like compacts, and charged onto the hearth of a reduction furnace for reduction while maintaining the temperature inside the furnace at not less than 1100° C. As the sheet-like compacts can be obtained by compacting mixture of raw material by use of rollers or the like, processing time is much shorter than the case of pelletization or agglomeration. A drying step is unnecessary since feeds are placed no the hearth via a feeder chute or the like. The method is carried out with ease by use of the facility according to the invention. High quality hot metal can be produced by charging reduced iron in hot condition obtained by the method described as above into a shaft furnace or a in-bath smelting furnace for melting at high thermal efficiency.

32 Claims, 15 Drawing Sheets

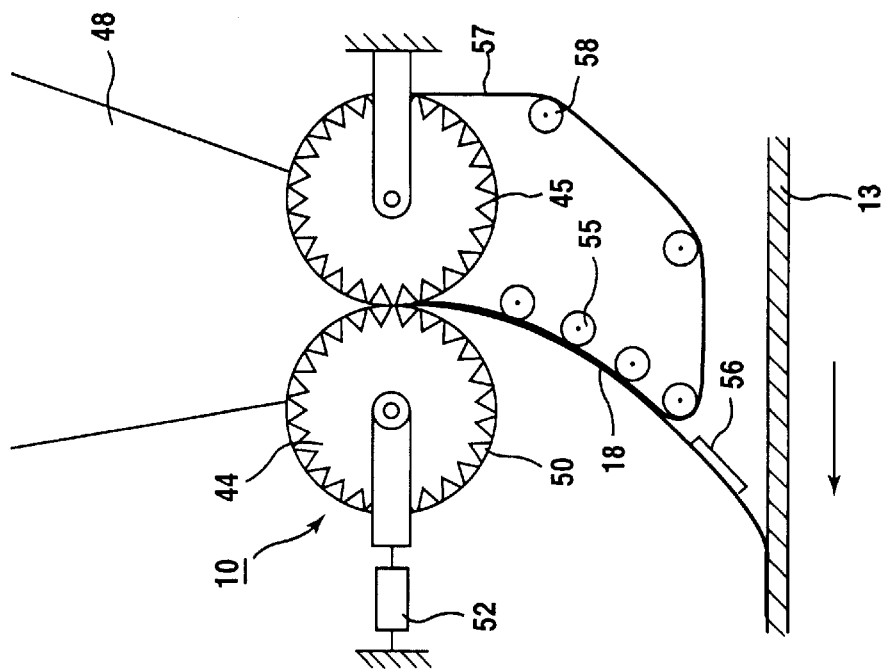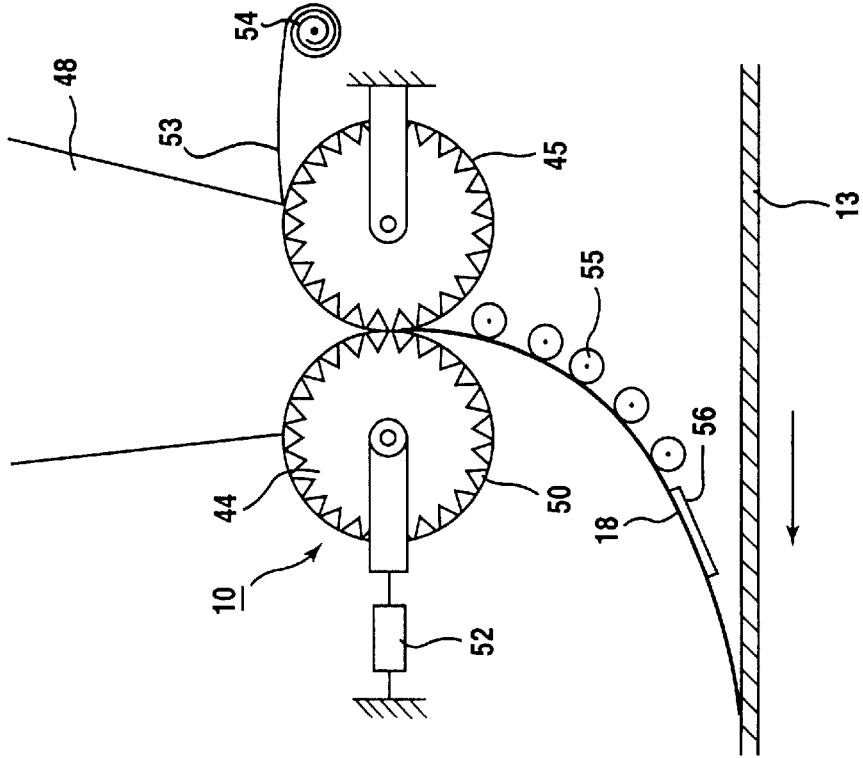

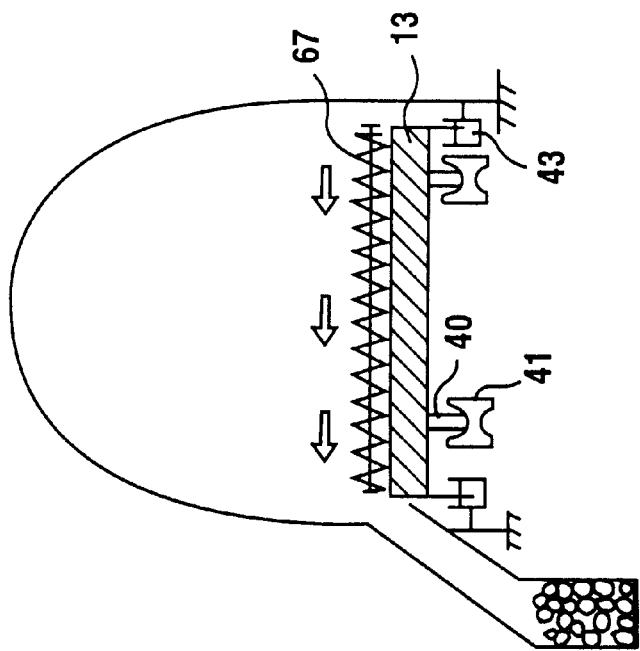
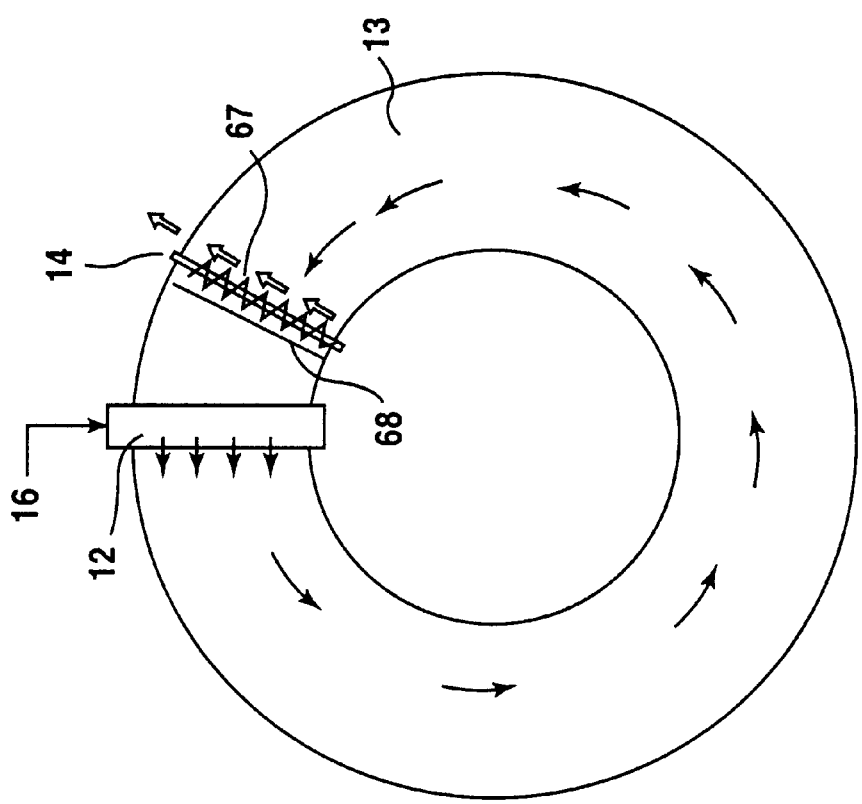

METHOD AND FACILITY FOR PRODUCING REDUCED IRON

This is a application of a divison of Ser. No. 09/112,359 filed Jul. 9, 1998, now U.S. Pat. No. 6,015,527, which is a 3.71 national stage filing of international application PCT/JP97/04091, filed on Nov. 10, 1997.

TECHNICAL FIELD

The present invention broadly relates to production of reduced iron, and production of hot metal therefrom. More particularly, the present invention is concerned with a method of and a facility for producing reduced iron by compacting fine iron oxides, for example, fine iron ore, iron-bearing dust, sludge, scale, and the like which are generated at steel mills, in admixture with powdery solid reductants, for example, coal, charcoal, petroleum cokes, cokes, and the like, into sheet-like shape without agglomerating aforesaid raw materials, and by charging sheet-like compacts into a heated furnace for reduction at a high temperature, and further, with an method of producing hot metal by charging the reduced iron kept in a hot condition into a shaft furnace or a in-bath smelting furnace.

BACKGROUND TECHNOLOGY

With recent growth in production of steel products by means of electric furnaces, much attention has been drawn to a technology of obtaining ferrous material as a feed therefor by solid reduction of iron ores. There has since been disclosed a process, representative of the technology, wherein solid metallized iron is produced by forming agglomerates, so-called "pellets", from fine iron ore in admixture with powdery solid reductants, and then reducing iron oxides contained in the fine iron ore through heating of the agglomerates at a high temperature (reference: for example, specification of U.S. Pat. No. 3,443,931, and Japanese Patent Laid-open No. 7-238307).

The process of reducing fine iron ore as disclosed in U.S. Pat. No. 3,443,931 described above comprises generally the following steps of:
1) forming green pellets by mixing fine iron ore with powdery solid reductants such as coal, coke, and the like,
2) removing water adhered to the green pellets by heating same in such a temperature range that combustible volatile constituents issued therefrom are not ignited,
3) reducing dried pellets by heating same at a high temperature to raise a metallization ratio, and
4) cooling metallized pellets before discharging same out of a furnace.

The conventional process of producing reduced iron as disclosed in U.S. Pat. No. 3,443,931 described above (for the sake of convenience, referred to as "pelletizing process" hereinafter) has fundamental problems as follows:
1) As an agglomerate (pellet) as merely agglomerated does not have sufficient physical strength to withstand handling during the process, it requires drying before charged into a reduction furnace. This entails installation of a drying unit in addition to a pelletizing furnace of complex construction, involving fairly high costs of operation and maintenance thereof. Furthermore, owing to a longer time required in the process from a step of drying the pellet to completion of a reduction step, production efficiency of the process is low, and it is difficult to hold down a cost of producing reduced iron.
2) It is impossible to avoid generation of particles outside a predetermined size range during the pelletizing process. As it is necessary to recycle undersize particles to a mixing step, and to crush oversize particles before recycling to the mixing step, the production efficiency is poor.
3) Iron oxides generated at steel mills such as iron-bearing dust, sludge, scale, and the like are among precious ferrous materials, however, these are often found in lumpy form when recovered, composed of fine particles bonded together, or in a form too large as pellet feed as in the case of scales. Accordingly, for pelletizing these iron oxides on their own in place of iron ore fine, or in admixture with iron ore fine, it is necessary to pulverize them to a predetermined size beforehand, necessitating installation of a pulverizing apparatus.

It is known that in reduction reaction of pellets, the higher a temperature at which the reaction takes place, the more rapidly the reaction proceeds. Hence, it is essential to heat up the pellets to a predetermined temperature rapidly by increasing a warming rate in order to improve productivity by increasing a reduction reaction rate. The process disclosed in the Japanese Patent Laid-open No. 7-238307 described above is characterized in that for a while after pellets are charged into a furnace, an oxygen containing gas is supplied onto the surface of the charged pellets, causing combustible matter issued from the pellets to be actively combusted so that a temperature on the surface of pellets is elevated to an optimum temperature for reduction by heat of combustion.

The process disclosed in the Japanese Patent Laid-open No. 7-238307 described above, however, belongs to a category of the pelletizing process consisting of steps of mixing, agglomeration, and drying, hardly solving the problems of the pelletizing process described above.

A furnace provided with a horizontally rotatable hearth (referred to as rotary hearth hereinafter) for heating is drawing attention in producing the reduced iron, and a same type furnace (referred to as rotary hearth furnace hereinafter) is used in the process as disclosed in the U.S. Pat. No. 3,443,931.

The rotary hearth furnace is characterized by its low capital cost as opposed to the case of a rotary-kiln furnace which has been in practical use over many years, however, due consideration should be given to charging of raw materials and discharging of a product since the hearth is horizontally rotated in the former case.

FIG. 1 is a schematic representation showing an example of conventional processes of producing the reduced iron by use of the rotary hearth furnace for heating of raw materials. As shown in the figure, fine iron ore 3 crushed to a predetermined size by a crusher 1, and pulverized coal 4 prepared by a dryer 2 and crusher 1 with bentonite 5 as binder added thereto are kneaded and mixed by a mixer 6 while water 7 and tar 8 are further added thereto. Mixed raw materials thus obtained are agglomerated by a pelletizer 9 or double-roll compactor 10, transferred to a feeder 12 of the rotary hearth furnace 11, and charged into the furnace, producing solid metallized iron by reducing iron oxides in the iron ore at a high temperature every time the rotary hearth 13 makes one turn. The metallized iron obtained is discharged from a product outlet 14. Reference numeral 15 denotes an exhaust outlet.

When the fine iron oxide and powdery solid reductants are kneaded an d mixed after drying and crushing as necessary, a binder such as water, tar, theriac, organic resin, cement, slag, bentonite, quick lime, slightly burnt dolomite, or slaked lime is added thereto if need be.

The mixed raw materials are agglomerated into pellets in the shape of a ball by a desk pelletizer, or briquettes by the double-roll compactor. As the mixed raw materials of a particle size, 0.1 mm or less in diameter, are suitable for pelletizing, and same of a particle size, 1 mm or less, are for briquetting, the materials require prior pulverization to a predetermined size. In some cases, drying or curing treatment is applied to the agglomerates that is, pellets and briquettes) to enhance physical strength thereof.

The agglomerates are sent to an upper part of the rotary hearth furnace via a belt conveyer, and charged via a feeding chute into the furnace so as to be spread in a wide area on the surface of the rotary hearth and smoothed out by a leveler. Subsequently, the agglomerates are heated and reduced while in rotation within the furnace, and turned into metallized iron.

The conventional process of producing reduced iron described above, however, has the following problem. That is, the agglomerates, due to powdering occurring thereto before charged into the rotary hearth furnace, will turn into agglomerates composed of particles of various diameters while generating fines, and charged onto the rotary hearth in such a condition. Then, generated fines are blown off by a combusting gas, and adhered in a molten condition to the wall of the furnace, causing troubles to facilities. In addition, the generated fines adhere in a molten condition to the rotary hearth, erode the hearth and roughen the surface of it.

Further, nonuniformity in firing results due to lack of uniformity in the size of the agglomerates, leading to the need of lengthening a firing time required for producing reduced iron of 92% metallization ratio, lowering productivity in producing the reduced iron.

Addition of the binder described above for prevention of an adverse effect of powdering of the agglomerates has been found effective to an extent, however, not successful in complete prevention of the powerdering. Furthermore, use of organic binders, which are expensive, results in a higher cost of production while use of inorganic binders having a constituent other than iron, that is, a slag constituent, has a drawback of degrading the quality of the reduced iron.

As described in the foregoing, the conventional pelletizing process has a number of problems.

Meanwhile, hot metal has been produced up to date primarily by the blast furnace process. In the blast furnace process, lumpy ferrous raw material and lumpy coke are charged into the furnace from the upper part thereof while hot blast is blown in through tuyeres provided in the lower part thereof so that the cokes are combusted, generating a reducing gas at a high temperature whereby iron oxides, main constituent of the ferrous material, are reduced and melted.

There has recently been developed another method of producing hot metal wherein reduced iron is produced by reducing lumpy ferrous raw material in a shaft reduction furnace, and the reduced iron in a hot condition is charged into a carbon material fluidized bed type melting furnace from the upper part thereof for reduction and melting. This method has already been put to practical application.

Various methods of producing hot metal directly from fine iron ores have also been developed. For example, in Japanese Patent Publication No. 3-60883, there has been disclosed a process wherein agglomerates are formed of fine iron ore and pulverized carbon material, the agglomerates are then prereduced in a rotary hearth furnace, and discharged at a temperature not less than 1000° C. into a smelting furnace having a molten metal bath therein while the pulverized carbon material is fed under the surface of the molten bath, thereby reducing and melting the prereduced agglomerates in the smelting furnace. In this instance, off-gas discharged from the smelting furnace is recycled into the rotary hearth furnace for use as fuel for prereduction.

The conventional technologies described above, however, have drawbacks as follows:

Firstly, the blast furnace process has a drawback of requiring lumpy ferrous raw material and coke. In this process, cokes are formed in coke ovens through carbonization of coal, and only lumpy cokes are used after screening. Deposits of hard coking coal for use in making cokes are unevenly distributed in geographical terms. In addition, other major problems with the process are huge capital outlay required in replacing the old coke ovens, and needs for prevention of air pollution caused by operation of the coke ovens. With respect to ferrous raw material, fine iron ores need to be agglomerated into pellets or sinters for use in the process except the case where lumpy ores are used. In view of a tight supply position of lumpy iron ore, and high costs of pellets, however, use of sinters has come to be in the mainstream of the steel industry's practice in Japan, but countermeasures for prevention of air pollution caused by sintering operation poses a major problem to the industry.

In the process of producing hot metal in the shaft reduction furnace, coke is not required, however, the process has a problem of requiring lumpy iron ore as ferrous raw material as in the case of the blast furnace process.

A process described in Japanese Patent Publication No. 3-60883 is considered effective, however, has a drawback that fine iron oxides and powdery solid reductants need to be mixed and agglomerated before being charged into a reduction furnace.

In the course of agglomeration, particles outside a predetermined size range are inevitably generated as described hereinabove. Accordingly, undersize particles are sent straight to a mixing step while oversize particles need to be crushed before recycled to the mixing step, deteriorating efficiency of the process. In addition, since agglomerates as merely agglomerated do not have sufficient strength to withstand handling, the agglomerates need to be dried before charged into the reduction furnace, entailing installation of a drying unit in addition to an agglomeration plant. Costs of operation and maintenance thereof are also involved. All these factors add up the production cost of reduced iron. Furthermore, time required for agglomeration and drying is relatively long in comparison with that for reduction, adversely affecting the efficiency of a plant as a whole.

In the case of utilizing iron oxides generated at steel mills such as iron-bearing dust, sludge, scale, and the like, on their own or in combination with iron ores, these are often recovered in the form of "a lump composed of fine particles bonded together", or in "shape too large as pellet feeds" as in the case of mill scales. Accordingly, the iron oxides need to be pulverized beforehand to a predetermined size, necessitating installation of a pulverizing apparatus.

The present invention has been developed to provide a method of and a facility for production of reduced iron in a simple and inexpensive way in place of the conventional pelletizing method, and further, to provide a method of producing high quality hot metal efficiently and at a low cost through a simple process using reduced iron obtained as above.

DISCLOSURE OF THE INVENTION

In a method according to the invention, an agglomeration step for ferrous raw material and fuel (a step of agglomerating raw material such as pelletization, and the like), and a drying step, which have been considered essential for prereduction of raw material, are dispensed with. More specifically, the method according to the invention is characterized in that fine ferrous raw material and powdery solid reductants are mixed with each other, compacted into sheet-like shape without agglomeration, and charged into a furnace, heated to not less than 1200° C., thereby reducing iron oxides.

The invention has features comprising a method of producing reduced iron (1), a facility for carrying out the method (2), and methods of producing hot metal from the reduced iron (3) and (4) described hereinafter:

(1) A method of producing reduced iron from fine iron oxides comprising the steps of a) through d) as follows;
   a) obtaining raw material mixture by mixing fine iron oxides with powdery solid reductants, b) compacting the raw material mixture into sheet-like compacts, c) placing the sheet-like compacts on the hearth of a reduction furnace, and d) reducing iron oxides contained in the sheet-like compacts by blowing fuel and oxygen-containing gas into a reduction furnace, and burning the fuel, combustible volatile constituents issued from the powdery solid reductants and the CO gas generated as a result of reduction of the iron oxides by the agency of the powdery solid reductants, so that a temperature inside the furnace is maintained at not less than 1100° C.

(2) A facility for carrying out the method (1) described above comprising;

a mixer for mixing the fine iron oxides with the powdery solid reductants, a compactor for compacting the raw material mixture obtained through the mixing step into the sheet-like compacts, a feeder for placing the sheet-like compacts on the hearth of the reduction furnace, and a reduction furnace for reducing the iron oxides contained in the sheet-like compacts fed therein, said reduction furnace being a rotary hearth furnace having a furnace body provided with a feeding inlet for the sheet-like compacts, a discharge outlet for the reduced iron produced through high temperature reduction of the iron oxides, and an exhaust outlet for off-gas generated therein, the hearth which is installed therein so as to be horizontally rotatable, and burners for combusting the fuel after the fuel and the oxygen-containing gas are blown in;

(3) A method of producing hot metal from fine iron oxides after completion of the steps a) through d) of the method (1) described above, comprising steps of e) through g) described below;

e) discharging the reduced iron obtained through the reduction step (pre-reduction step) described above and kept at not less than 500° C. from the reduction furnace (pre-reduction furnace), f) reducing and melting the reduced iron in a hot condition discharged through the discharge step described above by charging the reduced iron together with lumpy carbon material and flux into a shaft furnace from the upper part thereof, having a carbon material bed therein, and tuyeres in the lower part thereof for oxygen containing gas blown in therethrough to combust the carbon material disposed in front thereof, generating reducing gas at a high temperature, so that hot metal and molten slag are discharged through a tap hole provided in the lower part of the shaft furnace, and g) recovering off-gases generated in the shaft furnace, and recycling a part of the off-gases into the pre-reduction furnace for use as a fuel for pre-reduction.

(4) A method of producing hot metal from the fine iron oxides after completion of the steps a) through d) of the method (1) described above, comprising steps of e) through g) described below:

e) discharging the reduced iron obtained through the reduction step (prereduction step) described above and kept at not less than 500° C. from the reduction furnace (prereduction furnace), f) reducing and melting the reduced iron in a hot condition discharged through the discharge step described above by charging the reduced iron together with a carbon material and a flux into a in-bath smelting furnace from the upper part thereof, the in-bath smelting furnace having molten metal bath and molten slag bath therein, and through the bottom of which gas for agitation is blown into the molten metal bath for stirring up the molten metal bath and molten slag bath while oxygen is blown thereinto from the upper part thereof, so that hot metal and molten slag are discharged through a tap hole provided in the lower part of the in-bath smelting furnace, and g) recovering off-gases generated in the in-bath smelting furnace, and recycling a part of the off-gases into the pre-reduction furnace for use as a fuel for pre-reduction.

BRIEF DESCRIPTION OF THE DRAWINGS

FIG. 8(a) is a sectional view showing a schematic illustration of the construction of the feeding apparatus according to an embodiment of the invention.

FIG. 8(b) is a sectional view showing a schematic illustration of the construction of the feeding apparatus according to an embodiment of the invention.

FIG. 10(a) is a top view of the rotary hearth.

FIG. 10(b) is a longitudinal sectional view of the vicinity of the discharge outlet.

FIG. 19(*a*) is a vertical cross sectional illustration test furnace for high temperature reduction used in carrying out a test for an example.

FIG. 19(*b*) is a cross sectional view taken along arrow A—A in FIG. 19(*a*).

BEST MODE OF CARRYING OUT THE INVENTION

A method of, and a facility for producing reduced iron, and a method of producing hot metal, according to the invention, are described in detail hereinafter.

The method of producing reduced iron according to the invention (the invention referred to in (1) above) is a process wherein fine iron oxides are reduced at a high temperature by compacting a mixture of fine iron oxides and powdery solid reductants into a sheet-like shape, placing sheet-like compacts on the hearth of a reduction furnace, blowing fuel and oxygen containing gas into the reduction furnace, and burning the fuel, combustible volatile constituents (VM) issued from the powdery solid reductants and the CO gas generated as a result of reduction of the iron oxides by the agency of the powdery solid reductants, so that a temperature inside the furnace is maintained at not less than 1100° C.

In this context, "fine iron oxides" refer to fine ferrous raw materials containing iron oxide as its main constituent, and more specifically, to aforesaid fine iron ore and iron-bearing wastes generated at steel mills such as dust, sludge, scale, and the like. Each of these can be used on its own or in a mixture of two or more.

Then, "powdery solid reductants" refer to powders of a solid material containing mainly carbon, such as coal, charcoal, petroleum cokes, cokes, and the like. Each of these can also be used on its own or in a mixture of two or more.

Further, "sheet-like compacts" refer to a continuous band (referred to as "in a sheet-like form" hereinafter) formed by compacting a mixture of fine iron oxides and powdery solid reductants. The sheet-like compacts in the form of a perfect sheet is preferable, but may have cracks occurring thereto. The width of the sheet-like compacts may be selected at option depending on the scale of the reduction furnace. Adequate thickness thereof is generally in the range of 10 to 20 mm.

Figure 1:
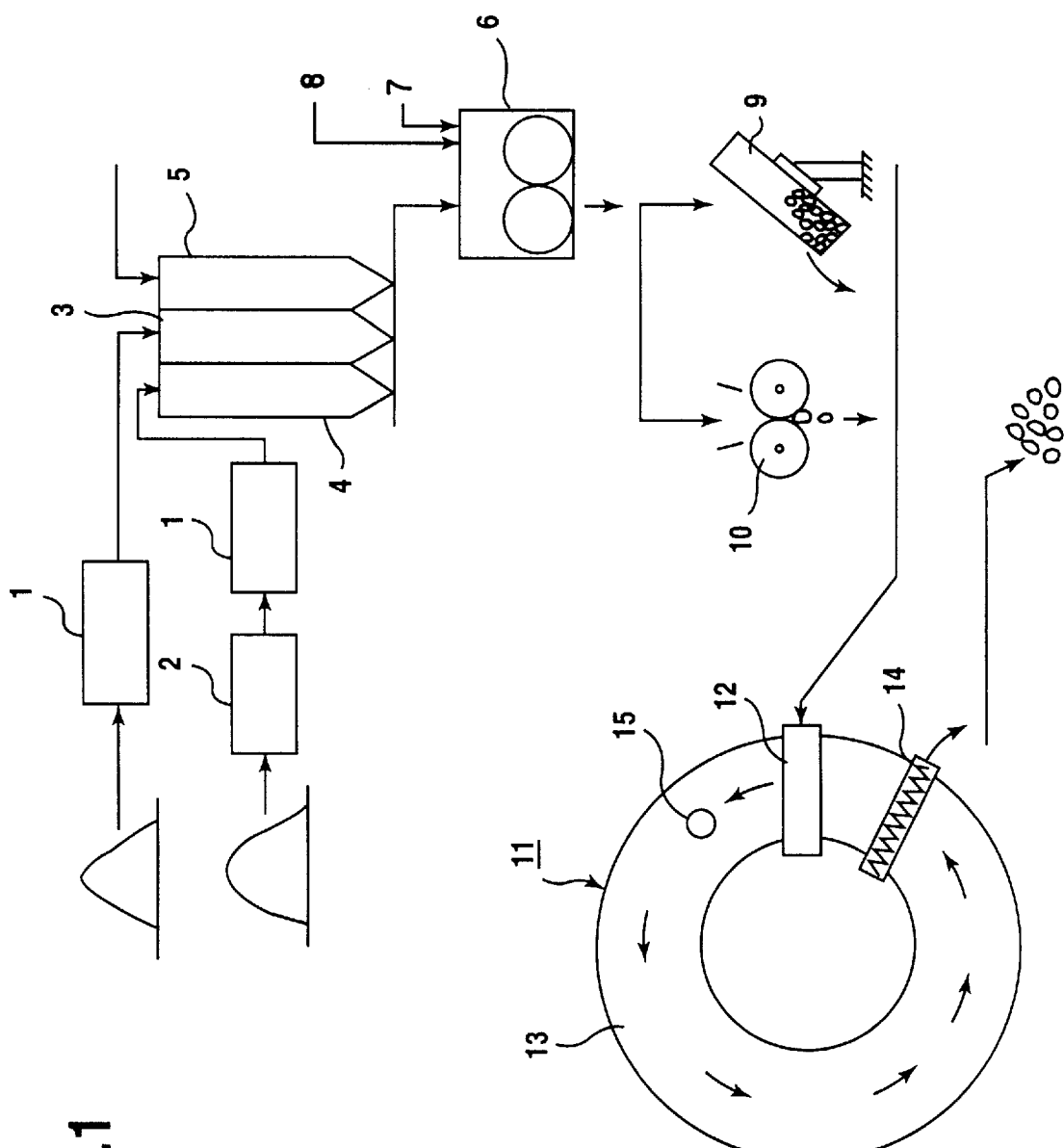
FIG. 1 is a schematic illustration showing a conventional process of producing reduced iron by way of example.

There is no particular restriction on a type of the reduction furnace used in carrying out the invention, however, the rotary hearth furnace as illustrated in FIG. 1 shown hereinbefore, that is, the reduction furnace provided with a horizontally rotatable hearth (rotary hearth) is advisable because of its capability for continuous operation.

In the method of producing reduced iron according to the invention, firstly a mixture (mixture of raw materials) is prepared by mixing fine iron oxides with powdery solid reductants.

In mixing fine iron oxides with powdery solid reductants, some amount of water or binder (bentonite, lime, organic binders, emulsion, oil, surface-active agent, or the like), or both may be added. This facilitates uniform and rapid mixing, and furthermore, formation of the sheet-like compacts.

Lime (burnt lime, limestone, or the like) may also be added for adjustment of basicity of slag constituent contained in the reduced iron. This enables concentration of sulfur contained in off-gas emitted from the reduction furnace to be lowered. Use of limestone also contributes to improvement in a unit fuel consumption as the effect of endothermic reaction accompanying decomposition of limestone is compensated for during firing in the reduction furnace.

In the method according to the invention, there is no need of agglomerating the mixture of raw materials, and accordingly, coarse crushing of scales, and the like suffices the need, requiring no pulverization.

In the case of using dust containing zinc (Zn), and the like for the raw material, a possibility of the quality of a product being degraded due to residual zinc remaining in the reduced iron is a matter of concern, however, a metal of a low boiling point such as zinc is evaporated in the furnace used in the method according to the invention which is kept at a high temperature, and discharged together with off-gas out of the furnace. It is possible therefore not only to lower the content of such metals having a low boiling point as zinc, and the like remaining in the reduced iron product, improving the quality of the product, but also to recycle and use the metals which can be enriched in dust arrested by a dust collecting equipment.

In the next step, the mixture of the fine iron oxides and powdery solid reductants is compacted into a sheet-like shape, and the sheet-like compacts are placed on the hearth of the reduction furnace.

There is no particular restriction on a means of forming the sheet-like compacts, however, use of a compacting method, particularly, by a double-roll compactor described hereinafter is preferable from the viewpoint of simplicity of the compactor, easy formability, and high forming efficiency.

Figure 2:
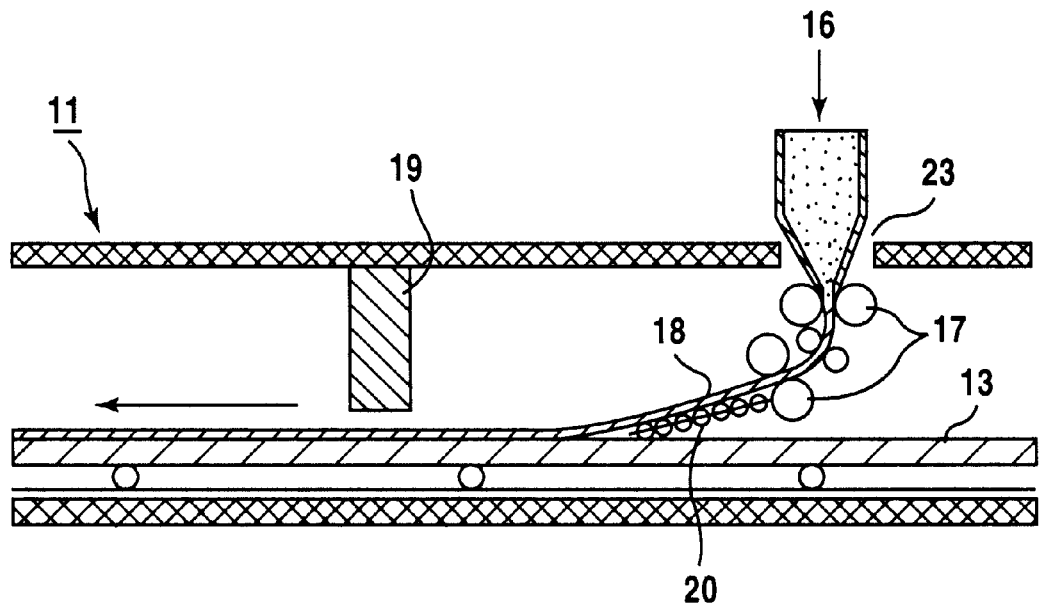
FIG. 2 is a longitudinal section showing an example of compacting and feeding apparatus.

As shown in FIG. 2, with reference to which detailed description is given hereinafter, the mixture of the raw materials 16 is compacted into the sheet-like shape by, for example, pairs of rolls 17, and placed on the hearth 13.

Figure 3:
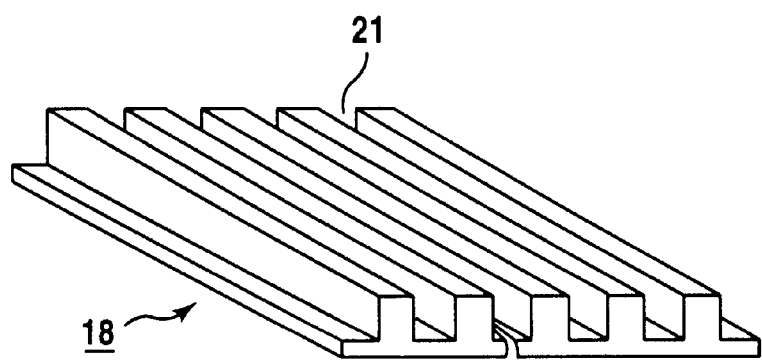
FIG. 3 is a view illustrating a shape of a sheet-like compact by way of example.

The surface area (that is, area receiving heat) of the sheet-like compact 18 can be enlarged when provided with projections on a surface opposite to a surface facing the hearth, for example, cutting grooves 21 as shown in FIG. 3, restraining a decline in a warming rate of the sheet-like compact accompanying an increase in the thickness the thereof. Further, as result of this, the weight of the raw materials loaded on a unit surface area of the hearth are increased, enhancing productivity.

Subsequently, iron oxides contained in the sheet-like compacts is reduced by blowing fuel and oxygen-containing gas into the reduction furnace, and burning the fuel, combustible volatile constituents issued from the powdery solid reductants and the CO gas generated as a result of reduction of the iron oxides by the agency of the powdery solid reductants, so that a temperature inside the furnace is maintained at not less than 1100° C., thus producing the reduced iron.

Ordinary fuel such as natural gas, heavy oil, or the equivalent is used for a fuel used in the process. Combustible gases are discharged as off-gas from a smelting furnace (a shaft furnace or a in-bath smelting furnace) operated in later steps of the process, and may be used for the fuel.

For the oxygen-containing gas, air or gas containing oxygen in concentration equivalent to or somewhat higher than that for air may preferably be used.

A temperature in the furnace for high temperature reduction is set at not less than 1100° C. Reduction will proceed even at a temperature below 1100° C., however, a reduction rate is so low in such a temperature range that such a practice is undesirable for industrial production. It is desirable to maintain a temperature in the furnace on the order of 1200 to 1400° C. in order to attain a sufficiently high rate of reduction because temperatures at a sheet-like compact become lower than the temperature in the furnace due to the effect of endothermic reaction of the iron oxides during reduction.

The temperature in the reduction furnace, however, is to be adjusted depending on a condition of progress in reduction, nature of ferrous raw material and powdery solid reductants, a mixing ratio and the like. More specifically, when raw materials charged into the furnace are still at a low temperature in a period immediately after charging of the raw materials, it is advantageous to raise a temperature of the charged raw materials by maintaining the temperature in the furnace on a higher side from the viewpoint of promoting reduction. Further, since a melting point of the charged raw materials varies depending on, for example, composition of gangues contained in iron ores, and same of ash content in a coal, due care should be exercised to prevent flowing out of melted raw materials by controlling the temperature in the furnace provided that an adequate amount of a liquid phase formed in the charged raw materials is beneficial for heat transmission and promotion of reaction, and should therefore be made active use of.

In reducing iron oxides at a high temperature, it is desirable to raise a temperature of the sheet-like compacts rapidly up to an optimum reduction temperature in order to shorten time required for reduction. To this end, in heating the sheet-like compacts, oxygen-containing gas may be supplied to the surface of the sheet-like compacts to combust a combustible volatile constituents issued therefrom on the surface thereof until issuing of the volatile constituents is substantially ceased, and may continue heating so that the temperature in the furnace reaches to not less than 1100° C., preferably, not less than 1200 to 1400° C. after issuing of the volatile constituents is ceased.

Then, for preventing reduced iron from sticking to the hearth in the reduction furnace, a method may be adopted wherein the powdery solid reductants are spread to form a thin film over the hearth in the reduction furnace, and the sheet-like compacts are placed on the thin film.

In the method of producing reduced iron according to the invention, the sheet-like compacts are obtained by simply compacting the mixture of raw materials with a roller or the like as described above, and accordingly, processing time is much shorter than that for pelletization or agglomeration while operation and maintenance of a compacting apparatus are carried out with ease. Further, pellets as merely agglomerated do not have sufficient strength, and need to be dried to increase physical strength thereof, however, the sheet-like compacts do not undergo disintegration without going through a drying step provided that these are placed on the hearth via the support roller or the like as shown in FIG. 2. Even in case that the sheet-like compacts are subjected to a high temperature, and some cracks occur thereto, this will not lead to disintegration, causing no problem with reduction.

The facility for producing reduced iron according to the invention (the invention described hereinbefore in (2) above) is the facility for carrying out the invention described hereinbefore in (1) above.

The facility comprises a mixer for mixing the fine iron oxides with the powdery solid reductants, a compactor for compacting the raw material mixture obtained through the mixing step into the sheet-like compacts, a feeder for placing the sheet-like compacts on the hearth of the reduction furnace, and a rotary hearth furnace for reducing the iron oxides contained in the sheet-like compacts fed therein. The rotary hearth furnace is provided with a furnace body having a feeding inlet for the sheet-like compacts, a discharge outlet for the reduced iron produced through high temperature reduction of the iron oxides, and an exhaust outlet for off-gas generated therein, the hearth which is installed therein so as to be horizontally rotatable, and burners for combusting the fuel after the fuel and the oxygen-containing gas are blown in.

Figure 4:
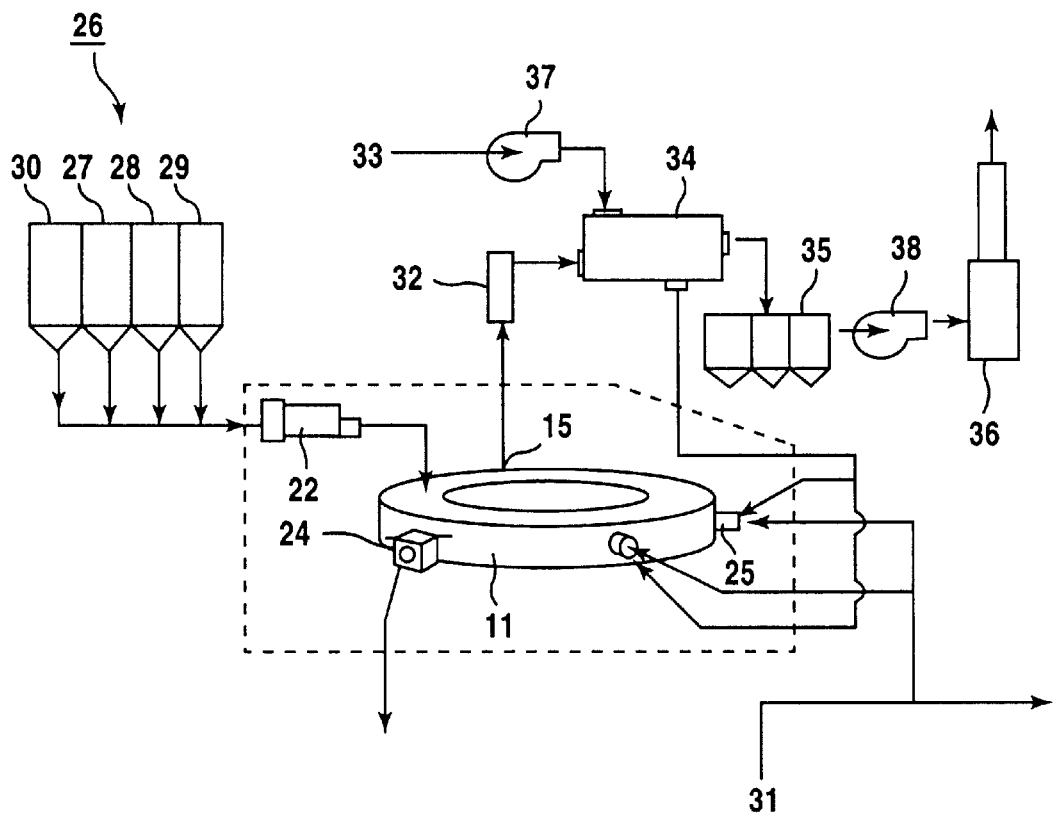
FIG. 4 is a schematic view showing a facility for production of reduced iron according to the invention, and a method of producing reduced iron using the facility.
Figure 5:
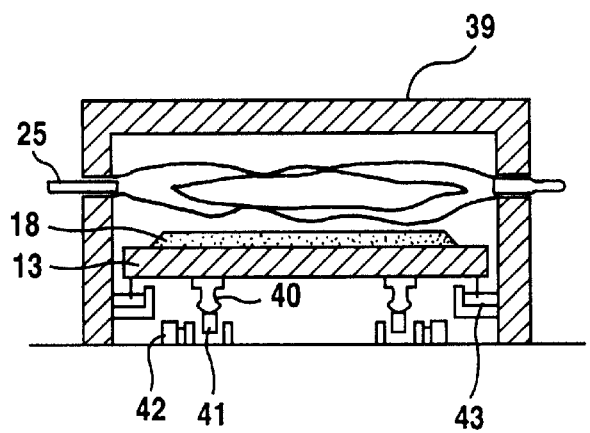
FIG. 5 is a longitudinal section of a rotary hearth furnace, showing a vertical section against the direction of advance of the hearth.

FIGS. 4 and 5, and FIG. 2 shown hereinbefore are views for illustrating the facility for producing reduced iron according to the invention. FIG. 4 is a schematic illustration showing a production facility in its entirety and an entire process. In the figure, the facility according to the invention is shown in an area surrounded by a broken line. FIG. 5 is a vertical section of the rotary hearth furnace, showing a section crossing the direction of movement of the hearth. FIG. 2 is a vertical section of an example of a compacting and feeding apparatus, showing a section in parallel with the direction of movement of the rotary hearth.

As shown in FIG. 4, the facility for producing reduced iron according to the invention comprises a mixer 22 for mixing the fine iron oxides with the powdery solid reductants, a compacting and feeding apparatus not shown (disposed above the rotary furnace 11 as shown in FIG. 2) and a rotary hearth furnace 11. The rotary hearth furnace is provided with a feeding inlet 23 for charging the mixture of raw materials (refer to FIG. 2), a discharge outlet 24 for reduced iron, and an exhaust outlet 15 for gases generated therein (off-gas), and burners 25 for combusting fuel after the fuel and oxygen-containing gas are blown in.

In the figure, binders 29 and dust 30 in addition to fine iron oxides (fine iron ore) 27 and powdery solid reductants 28 are sent from hoppers 26 for receiving raw materials to a mixer 22 for mixing. A part of off-gas 31 from a smelting furnace, used for generation of electric power, and the like, is used as fuel for the method. Air 33 preheated by heat generated through combustion of gases (off-gas) exhausted from an exhaust outlet 15 in an off-gas combustion apparatus 32 is used for the oxygen-containing gas. The off-gas is discharged to atmosphere via a dust collector 35 and a desulfurization apparatus 36 after passing through a heat exchanger 34. Reference numeral 37,38 denotes a blower.

As shown in FIG. 5, the hull of the rotary hearth furnace is a furnace body 39, inside which a hearth horizontally rotatable (rotary hearth 13 ) is installed. A track 40 is attached to the underside of the hearth 13, and the hearth 13 is rotated at a predetermined speed by fixed driving wheels 41 by a driving means 42. The furnace is sealed by sealing water 43. The sheet-like compacts 18 placed on the hearth 13 are reduced by heat of combustion of the fuel blown in through the burner 25.

The compacting and feeding apparatus shown in FIG. 2 is constructed such that the mixture of raw materials 16 is compacted into the sheet-like compacts 18 by rollers 17, and the sheet-like compacts 18 are continuously fed onto the hearth in step with advance of a platform car constituting the rotary hearth 13. Reference numeral 19 denotes a shield plate for protecting the roller 17 and the like from heat radiated from the hearth, and reference numeral 20 supporting rollers.

A variety of methods and apparatuses are available for charging the mixture of raw materials into the rotary hearth furnace as described more specifically hereinafter.

For example, a method may be adopted wherein the mixture of raw materials is compacted into sheet-like shape, when charging same into the reduction furnace provided with the rotary hearth, by use of a double-roll compactor disposed above the hearth such that axes of the double rolls intersect the direction of advance of the hearth at right angles, the sheet-like compacts discharged from the double-roll compactor are received by a feeder chute, and then placed on the hearth for production of reduced iron.

A reason for compacting the mixture of raw materials by the double roll compactor disposed above the hearth such that the axes of the double rolls intersect the direction of advance of the hearth at right angles is to minimize handling from compacting until charging of feeds onto the hearth. That is, by adoption of a feeding method whereby compacted raw material is once received by the feeding chute, and then placed on the rotary hearth, material handling is limited to discharge of the compacted raw material from the nip of the rolls of the double-roll compactor onto the feeding chute and causing same to slide down along the chute onto the hearth, lightening impact on the compacted raw material due to handling.

Then, a reason for compacting the mixture of raw materials by the double roll compactor provided with two rolls, the axes thereof intersecting the direction of advance of the hearth at right angles is to charge the compacted raw material discharged from the nip of the rolls of the double-roll compactor onto the hearth so as to slide down along the feeding chute with little shift in the crosswise direction of the hearth. Consequently, the sheet-like compacts can be charged into the furnace without cracking or the like occurring thereto.

Figure 6:
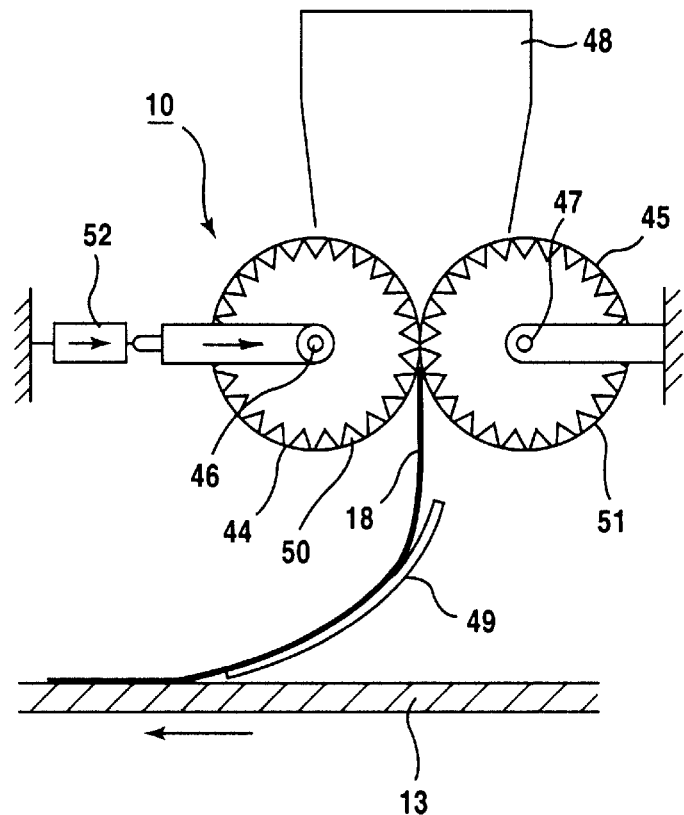
FIG. 6 is a view illustrating the principal part of a feeding apparatus according to an embodiment of the invention.

FIG. 6 is a schematic illustration showing, by way of example, the principal mechanism of a feeding apparatus used in carrying out the invention for feeding raw material for production of reduced iron. As shown in the figure, the feeding apparatus is provided with the double-roll compactor 10 for compacting the mixture of raw materials supplied from a raw material hopper 48, disposed above the rotary hearth 13 (directly overhead in this case) such that the axes 46,47 of two rolls 44,45 intersect the direction of advance of the rotary hearth 13 at right angles, and a feeder chute 49 for receiving and placing the sheet-like compacts 18 discharged from the double roll compactor 10 on the rotary furnace.

The double roll compactor 10 has two rolls consisting of a pressing roll 44 provided with a pressing roll gear 50, and a stationary roll 45 provided with a stationary roll gear 51 which are disposed such that the axis of the stationary roll 47 is fixed while the axis of the pressing roll 46 is movable in the direction of the arrow shown in the figure, or in the reverse direction for adjustment of pressure applied for compacting the mixture of raw materials.

The pressure applied is to be adjusted depending on the kind of raw material, the shape of the compacts, an amount of the binder, and like, however, may be unnecessary in a condition where compacting is achieved with ease. Normally, the axes of the two rolls are disposed at the same level, however, may be at different levels.

As shown in the figure, the feeder chute 49 disposed immediately below the double roll compactor 10 is a chute inclined towards the direction of advance of the rotary hearth 13 so that the sheet-like compacts 18 discharged from the nip of the rolls of the double roll compactor are placed on the rotary hearth 13 with impact on the sheet-like compacts 18 being softened.

In an embodiment shown in the figure, the pressing roll 44 is disposed on the side towards the direction of advance of the hearth 13 (that is, on the downstream side). Such positioning enables the sheet-like compacts 18 to be subjected to less impact force and is therefore preferable because larger compressive force acts on the sheet-like compacts 18 on the side of the pressing roll 44 than on the side of the stationary roll 45, resulting in discharge of the sheet-like compacts in a condition slightly warped towards the side of the pressing roll 44.

Accordingly, by use of the feeding apparatus described above, the sheet-like compacts are subjected to less impact force until charged onto the rotary hearth, and can therefore be placed thereon without causing large cracks, and the like.

Alternatively, a plurality of double roll compactors provided with rolls shorter in length may be disposed in the transverse direction of the rotary hearth to carry out the invention.

Figure 7:
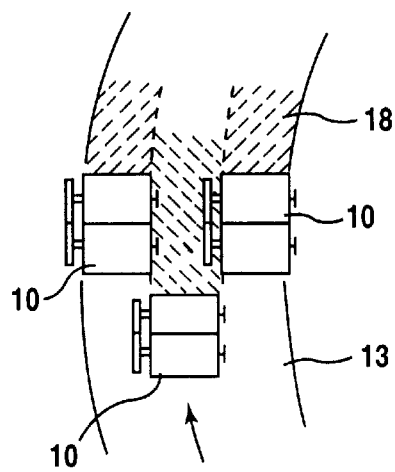
FIG. 7 is a view illustrating an arrangement of a plurality of double-roll compactors by way of example.

For compacting the mixture of raw materials by use of a single double roll compactor, a compactor provided with rolls having a length equivalent to a width of the rotary hearth is required, and furthermore, pressure at the center of each of the rolls becomes lower, reducing physical strength of compacts. With use of the plurality of the double roll compactors provided with rolls short in length, but equivalent to the width of the rotary hearth in total length, compacted raw material of sufficient strength across the width of the hearth and with no difference in strength along the longitudinal direction of the rolls can be produced. As shown in FIG. 7, the plurality of the double roll compactors are disposed in a staggered manner across the width of the hearth 13, not in alignment with each other, so that the sheet-like compacts 18 discharged from the respective double roll compactors 10 are placed on the hearth without gaps in-between.

A double roll compactor provided with tapered rolls, the diameter of each increasing towards the external circumference of the hearth, may also be used.

Since a transfer speed of the hearth is greater on the side of the external circumference than on the side of the internal circumference, a feeding rate of raw material per unit surface area of the hearth on the side of the external circumference differs from same on the side of the internal circumference provided that a feeding rate of the sheet-like compacts discharged from the double roll compactor remain constant across the width of the hearth. As a result, in the case of a difference in the radius between the external circumference and the internal circumference being large, or the hearth rotating at a high speed, the sheet-like compacts are subjected to stress when placed on the hearth, causing cracks or the like. In such a case, with use of the double roll compactor provided with tapered rolls as described above, the feeding rate of the sheet-like compacts can be varied across the width of the hearth so that the feeding rate of raw material per unit surface area of the hearth is rendered unchanged from the external circumferential side to the internal circumferential side.

A feeder chute having a part concavely curved in a longitudinal section along the direction of advance of the furnace may be used in place of the flat plate type chute.

In the case of such a curved chute, it is desirable to use a chute having a tip tilted at a small angle, that is, in a condition substantially horizontal so that a difference in height between the tip and the hearth is as small as possible. By charging the sheet-like compacts through the feeding apparatus having the curved chute, vertical impact force acting on the sheet-like compacts when placing same on the hearth is diminished, minimizing a risk of cracks, and the like occurring.

Further, a tip chute detachable, and attached rotatably around a connection point as a fulcrum, and having the extremity thereof in contact with the hearth may be used in place of the feeder chute fixedly attached to the feeding apparatus as described above.

When charging the sheet-like compacts along the feeder chute onto the hearth, it is desirable to minimize vertical impact force acting on the sheet-like compacts being charged by keeping the tip of the feeder chute in contact with the hearth. In the case where there have occurred asperities on the surface of the hearth, caused by adhesion thereto of raw material, charging operation by use of the feeder chute fixed to the feeding apparatus with the tip of the feeder chute, kept in contact with the surface of the rotary hearth, the tip of the feeder chute can get caught by the surface of the hearth, causing troubles, for example, deformation of the feeder chute.

Such a problem can be overcome by charging the sheet-like compacts using the feeding apparatus provided with the tip chute attached rotatably around a connection point as a fulcrum because the tip of the feeder chute can make vertical movements, up and down, with ease according to the asperities on the surface of the hearth, and is kept in constant contact with the hearth without being caught by the asperities thereon.

A tip portion of the feeder chute in contact with the hearth wears out, and a length of the tip portion becomes shorter with progress in wearout with the result that the tip portion tends to tilt at a greater angle against the horizontal. In such a case, the tip portion can be simply replaced, making maintenance work much easier than for the case of the feeder chute fixed to the feeding apparatus.

Production of reduced iron may be carried out by use of the double-roll compactor disposed above the rotary hearth and provided with two rolls such that the axes of the rolls intersect the direction of advance of the rotary hearth at right angles, when charging the mixture of raw materials into the reduction furnace provided with the rotary hearth so that the mixture of raw materials is compacted into the sheet-like compacts via a thin film in intimate contact with either one of the rolls, and the sheet-like compacts are placed on the hearth together with the film.

As the mixture of raw materials in a condition bonded to (pasted on) the film is discharged in a sheet-like form from the double-roll compactor, the sheet-like compact together with the film can be bent in the direction of advance of the hearth (that is, in such a way as to cause a horizontal angle of the tip of the sheet-like compact against the hearth to become small), and placed on the furnace for heating.

FIG. 8(a) is a sectional view showing a schematic illustration of the construction of the feeding apparatus according to an embodiment of the invention.

As shown in the figure, the apparatus comprises a film holder 54 for supplying the film 53 to be passed in intimate contact with either one (stationary roll 45, in this case) of the rolls together with the mixture of raw material through the double roll compactor, and rollers 55 for supporting the sheet-like compact 18 in a condition substantially pasted on the film, discharged from the double roll compactor, and for causing the sheet-like compact 18 to be bent in the direction of advance of the hearth 13. In the case of this embodiment, the feeding apparatus is provided with a guide chute 56 for guiding the sheet-like compact 18 transferred by the rollers 5 for supporting the sheet-like compact onto the hearth.

For the film to be passed together with the mixture of raw materials through the double roll compactor, a material which is wide, long, thin in a film-like shape, and in addition, combustible in the rotary hearth furnace is required. Inorganic constituents contained in the film will remain in reduced iron products. Accordingly, a hydrocarbon-based or carbohydrate-based film containing hardly any inorganic constituents is preferable. More specifically, polyethylene or paper described hereinafter is a suitable material.

In the method and the apparatus therefor according to the invention, the mixture of raw materials is compacted via the thin film, the sheet-like compact obtained is unsusceptible to cracking and the like, and the sheet-like compact wide in width can be placed on the hearth with ease.

Production of reduced iron may also be carried out by use of the double-roll compactor, when charging the mixture of raw materials into the reduction furnace provided with the rotary hearth, wherein the mixture of raw materials is compacted into the sheet-like compacts via a belt in intimate contact with either one of the rolls, the sheet-like compact is transferred together with the belt to a position in close proximity of the hearth, and then, the raw material sheet is separated from the belt so that the raw material sheet is placed on the hearth while the belt is returned to the double roll compactor.

FIG. 8(b) is a sectional view showing a schematic illustration of the construction of the feeding apparatus according to another embodiment of the invention.

As shown in the figure, the apparatus comprises sheet-supporting rollers 55 for supporting an endless belt 57 to be passed in intimate contact with either one (stationary roll 45, in this case) of the rolls together with the mixture of raw material through the double roll compactor, and for supporting the sheet-like compact 18 in a condition substantially pasted on the belt, discharged from the double roll compactor, as well as for causing the sheet-like compact 18 to be bent in the direction of advance of the hearth 13, and belt carrier rollers 58 for driving the belt. In the case of this embodiment, the feeding apparatus is provided with a guide chute 56 for guiding the sheet-like compact 18 transferred by the sheet-supporting rollers onto the hearth. The guide chute may be in a plate-like form, however, a roller chute is preferable for smooth flow of the raw material sheet.

For the belt to be passed together with the mixture of raw materials through the double roll compactor, a material needs to be wide and long. And, strength sufficient for continuous use is required. More specifically, a belt made of rubber can be used, however, a metallic belt described hereinafter is preferable.

The sheet-like compact obtained by use of the apparatus is unsusceptible to cracking, and the sheet-like compact wide in width can be placed on the hearth with ease while the belt for holding compacted raw material in a sheet-like form can be circulated endlessly. Further, since only the sheet-like compact is loaded on the hearth, there is not risk of impurities being mixed into reduced iron products.

Production of reduced iron may further be carried out by use of a method wherein in charging the mixture of raw materials into the reduction furnace provided with the rotary hearth, the mixture of raw materials is supplied onto a tilted chute constituted by a belt circulating in the direction of advance of the hearth, disposed above the hearth, and compacted into sheet-like shape by a roller so that the sheet-like compact on the belt, after transferred to a position in close proximity of the hearth, is separated from the belt for further transfer onto a feeder chute in flat plate form, and then placed on the hearth.

In this instance, the sheet-like compact can be placed on the hearth more smoothly by causing a supplementary transfer belt constituted by a belt circulating in the direction of advance of the hearth to be in contact with the surface of the sheet-like compact so as to place the sheet-like compact on the hearth by the agency of driving force of the belt.

Figure 9:
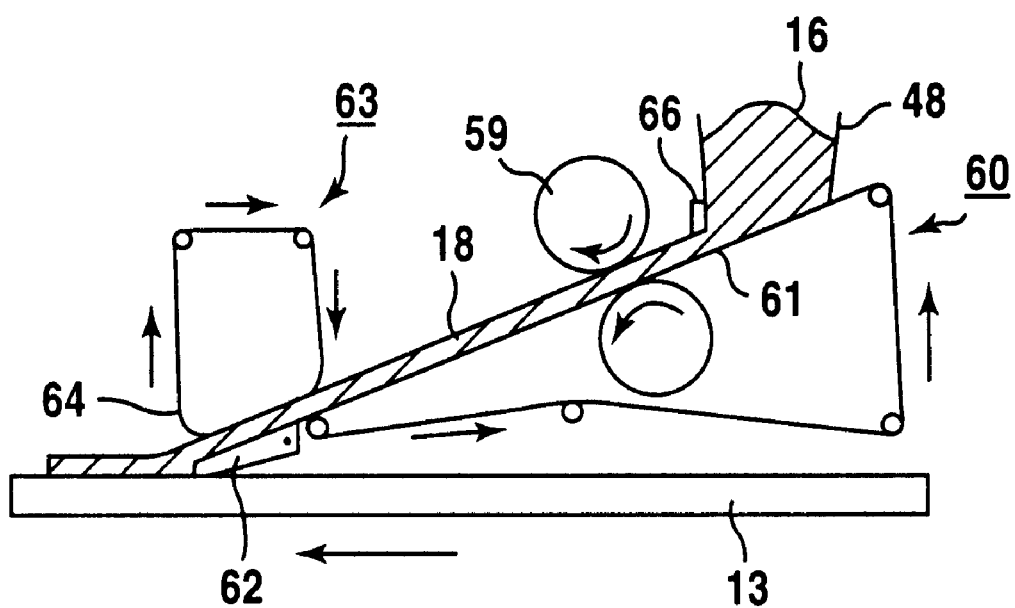
FIG. 9 is a view illustrating the principal part of a compacting and feeding apparatus according to another embodiment of the invention.

FIG. 9 is a schematic illustration showing the construction of an apparatus for carrying out the method according to a further embodiment of the invention as described above.

As shown in FIG. 9, the apparatus comprises rollers 59 for compacting the mixture of raw materials 16 fed from a raw material hopper 48 into the sheet-like compact, a tilted chute 60 for receiving the mixture of raw materials 16 from the raw material hopper 48 and transferring same in the direction of advance of the hearth 13, and a feeder chute 62 in flat plate form for receiving the sheet-like compact formed on the belt 61 by compressive force of the rollers 59 composing the tilted chute 60 and transferred together with the belt to a position in close proximity of the hearth. The rollers 59 are disposed so as to compress the mixture of raw material 16 on the tilted chute 60. It is desirable to squeeze the belt 61 of the tilted chute 60 therebetween from both sides, in order to compress the mixture of raw material strongly.

The mixture of raw materials 16 released from the raw material hopper 48 is supplied onto the tilted chute 60 to a predetermined thickness by means of the supply regulator plate 66, compacted on the tilted chute 60 into a sheet-like shape by the rollers 59, and transferred towards the direction of advance of the hearth 13.

Further, the apparatus is provided with a supplementary transfer belt 63 constituted by a belt 64 moving in the direction of advance of the hearth 13, disposed so as to be in contact with the surface of the sheet-like compact 18. The sheet-like compact is pushed towards the direction of advance of the hearth by driving force of the belt 64, and placed on the hearth more smoothly. A supplementary transfer belt may be disposed in the feeding apparatus shown in FIG. 6.

The roller, the tilted chute and the feeder chute may be divided into a plurality of rollers, tilted shutes and feeder shutes.

Production of reduced iron may further be carried out by use of a method wherein in mixing fine iron oxides with powdery solid reductants, all of fine iron oxides, powdery solid reductants, water, and a binder to be added as necessary are fed together into a mixer incorporating high-speed agitation impellers rotating at not less than 300 rpm, adjusting mixing so that a proportion of water to all raw materials becomes 6 to 18 mass %, and a mixture obtained is compacted into a sheet-like shape, and charged into the reduction furnace provided with the rotary hearth.

That is, for production of compacts having high strength by improving viscosity of fine raw material, hard mixing using a high-speed agitation mixer is applied to attain higher strength. In balling and compacting of powders in moist condition, wetting between powder particles occurs by water and liquid binders, and resultant capillarity causes aggregation force to act between the powder particles, achieving balling and compacting as well as higher strength. Hence, it is effective to apply hard mixing with strong agitation force to facilitate intrusion of water and binders between the powder particles.

To obtain the effect described above, it is effective to apply agitation mixing by use of the high-speed agitation mixer at not less than 300 rpm of revolution rate of the agitation impellers (that is, revolution rate of the high speed agitation mixer). This is because fine raw material is separated in unit of each particle at not less than 300 rpm of revolution rate of the high speed agitation mixer, and water and binders are more uniformly diffused between particles, effectively contributing to enhancement in strength while at less than 300 rpm of the revolution rate, separation in unit of each particle does not occur with no effect on strength.

A binder need not be added, however, is quite effective in enhancing strength because as described in the foregoing, in balling and compacting of powders in moist condition, the binder acts to enhance the strength of compacts in the same way as water, and even more intensely than water. Further, since hard mixing is applied, less amount of addition is required than in the case of mixing by use of an ordinary mixer, for example, an edge runner mill, or the like, thus contributing to restraining an increase in production cost and deterioration in the quality of reduced iron due to addition of the binder. Accordingly, it is effective to add a binder if need be taking into account the kind, and the like of raw material used. Tar, theriac, bentonite, and the like can be used for a binder, and an adequate amount of a binder to be added may be decided upon according to the kind of a binder to be used.

The reason for charging all of fine iron oxides, powdery solid reductants, water, and a binder to be added as necessary together into the high-speed agitation mixer is to obtain raw materials effectively mixed in a short time.

In this instance, water is added in such an amount that water content in the whole raw materials becomes 6 to 18% by mass. This is because in case of water exceeding 18% by mass, the effect of high speed agitation whereby water is uniformly diffused between powder particles can not be achieved owing to presence of excess water, while in case of water being less than 6% by mass, the effect of high speed agitation is limited owing to presence of irregularity in uniform diffusion of water between the powder particles due to lack of water. Water added may be in the form of not only liquid water but also vapor. Vapor having higher diffusibility is more effective than water.

Production of reduced iron may be carried out by a method wherein fine iron oxides containing 4.0 to 10.0% by mass of $Al_2O_3$ and $SiO_2$ in total are used for mixing with powdery solid reductants.

$Al_2O_3$ and $SiO_2$ are main constituents composing clay content, and the higher the content of $Al_2O_2$ and $SiO_2$ in raw material, that is, the clay content, the higher the strength of compacts formed therefrom. The clay content contained in fine iron oxides has better diffusibility than that of adhesive constituent in binders, and is able to provide sufficient adhesive force to each particle composing fine iron oxides.

In this method, the strength of compacted raw material is enhanced by making full use of the clay content contained in fine iron oxides instead of making use of adhesive force of binders as in the case of conventional methods.

The content of $Al_2O_3$ and $SiO_2$ in total is set in the range between 4.0 to 10% by mass because at less than 4% by mass, the effect of enhancing the strength of compacts is insignificant due to insufficiency in the clay content while in excess of 10% by mass, excessive clay content is included in reduced iron, degrading product quality.

In carrying out the method according to the invention, a binder may be added to a mixture of fine iron oxides and powdery solid reductants. Addition of the binder does not lead to diminishment in the effect of the method according to the invention with no adverse effect whatsoever.

Production of reduced iron may be carried out by a method wherein in mixing fine iron oxides with powdery solid reductants, fine iron oxides containing not less than 80% by mass of fines less than 0.1 mm in size, and coal, as powdery solid reductants, containing not less than 6% by mass of moisture, and not less than 50% by mass of coal fines not less than 0.1 mm and not more than 1 mm in diameter are used.

Use of fine iron oxides in small size, and use of coal in larger size as solid reductant are due to the fact that fine iron oxides are of high density while coal becomes very porous as volatile constituents is released when heated up to 500° C., and highly reactive even though in large size.

The reason for selecting the coal containing not less than 6% by mass of water and not less than 50% by mass of particles not less than 0.1 mm and not more than 1 mm in particle diameter is that coal stored in a coal yard normally contains not less than 6% by mass of water, and size distribution of the coal after crushing without drying is not less than 50% by mass of particles not less than 0.1 mm and not more than 1 mm in particle diameter. The upper limit of water in coal is an amount which can be absorbed during storage in the coal yard, and there is no specific numerical limitation. Against coal under such condition, fine iron oxides in adequate size are those containing not less than 80% by mass of fines —0.1 mm (passing through 0.1 mm sieve) in size.

In carrying out this method, there are cases where recovery rate of coal in size between 0.1 mm and 1 mm declines because when crushing coal meeting the condition described above, adhesion of a portion of coal to a crusher can occur.

Such adhesion of coal to the crusher is effectively prevented by use of a method whereby coal is crushed in admixture with a portion of iron ore. Soft material such as coal is prone to adhesion, but hard material such as iron ore is not. Hence, adhesion can be restrained by crushing mixture of both materials. Iron ore to be mixed with coal when crushing the coal need not contain not less than 80% by mass of fines—0.1 mm in size, and iron ore of coarse particle size may be used for the purpose.

In this method, a crusher used for adjusting sizes of fine iron oxides and/or powdery solid reductants is not limited to any particular type. Any type of crusher such as impact mill, roller mill, rod mill, ball mill, and the like may be used.

In carrying out this method, a binder may be added to a mixture of fine iron oxides and powdery solid reductants. Addition of the binder does not lead to diminishment in the effect of the method with no adverse effect whatsoever.

Further, with this method, gaps among particles of raw material making up the sheet-like compact, that is, porosity can be reduced and dense filling is achieved, enhancing the strength of the sheet-like compact charged into the rotary hearth furnace, and reducibility of fine iron oxides. As a result, reduced iron of high metallization ratio can be produced.

In a conventional method of producing reduced iron, agglomerates (pellets) are laid on the hearth to a thin thickness of 10 to 20 mm inside a rotary hearth furnace inside which temperature is maintained in the range of 1100 to 1300° C., the temperature of the agglomerates rises to not less than 900° C. mainly by heat radiated from the inner wall of the furnace, the agglomerates are reduced and sintered while adjusting a rotation speed of the hearth such that a predetermined metallization ratio is reached every time the hearth completes one turn, and products are discharged from a discharge outlet by a screw feeder.

FIG. 10 is a schematic illustration of a method of discharging reduced iron by the screw feeder used for discharging refuse, FIG. 10(a) a top view of the rotary hearth, and FIG. 10(b) a longitudinal sectional view of the vicinity of the discharge outlet. As shown in the figure, while mixture of raw material 16 charged onto the rotary hearth 13 from a feeding inlet 12 makes one turn accompanying a rotation of the hearth, iron oxides in the raw material are reduced at a high temperature, and discharged as reduced iron from the product discharge outlet 14 by the screw feeder 67. Reduced iron, after reaching the screw feeder 67, is transferred in the direction (as shown in the figure by the arrows in blank) at right angles against the direction of advance of the hearth 13 by rotation of the screw feeder, and discharged towards the peripheral side of the hearth 13. Further, immediately behind the screw feeder 67, a stopper fence 68 for storing reduced iron is installed. In the example as shown, a track 40 is provided under the hearth 13, and the hearth 13 is rotated at a predetermined speed by fixed driving wheels 41. The inside of the furnace is sealed by sealing water 43.

Transfer of reduced iron by the screw feeder is at a very slow speed, however, taking a fairly long time until reduced iron is discharged after reaching the peripheral side of the hearth. Consequently, quantity of reduced iron residing in front of the screw feeder increases. Particularly, reduced iron located on the edge of the hearth, on the side of the inner circumference thereof, ends up staying in the furnace for a long time because it needs to be transferred for a distance from the inner circumference side to the external circumference side, and further, is mixed up with reduced iron placed at other parts of the hearth.

To overcome such a problem, reduced iron produced by firing in the rotary hearth furnace needs to be discharged from the furnace rapidly. To this end, a number of methods described hereinafter may be adopted.

Production of reduced iron may be carried out by use of a method whereby reduced iron produced through reduction of iron oxides in the reduction furnace having the rotary hearth is discharged by, for example, a pushout device reciprocatingly movable in the direction at right angles to the direction of advance of the hearth.

Figure 11B:
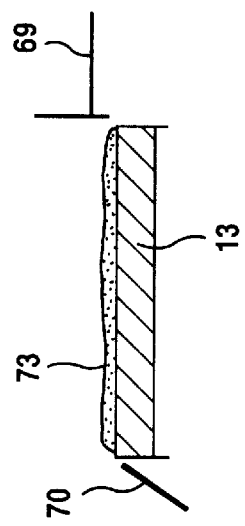
FIG. 11(b) is a cross-sectional view of FIG. 11(a) at section A—A.
Figure 11D:
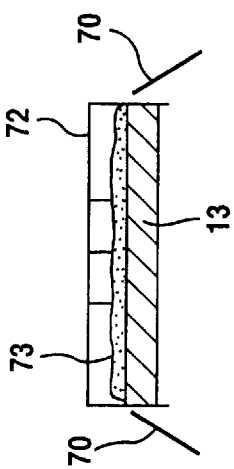
FIG. 11(d) is a cross-sectional view of FIG. 11(c) at section B—B.
Figure 11A:
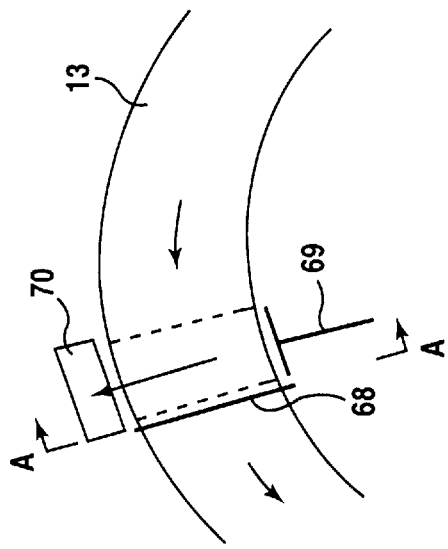
FIG. 11(a) is a top view illustrating an example of the method using a pusher as a method of discharge reduced iron according to the invention.

FIGS. 11(a) and 11(b) are views illustrating an example of the method using a pusher as the pushout device. FIG. 11(a) a schematic plan view, and FIG. 11(b) is a cross-sectional view of FIG. 11(a) at section A—A. As shown in the figures, the pusher 69, in plate form, serving as the pushout device, and reciprocally movable in the direction at right angles to the direction of advance of the hearth is disposed on the side of the inner circumference of the hearth (outside the hearth) in a discharge area of the rotary hearth furnace.

Reduced iron advancing towards the discharge area accompanying rotation of the hearth 13 is pushed out of the peripheral side of the hearth by movement of the pusher 69 in the direction of the arrow, and discharged via a discharge chute 70. In the example shown in the figure, as a stopper fence 68 is provided on the downstream side (on the side towards the direction of advance of the hearth) of a range of movement of the pusher 69 as shown by broken lines, and the pusher 69 moves along the stopper fence 68, discharge of entire reduced iron without any leftover is ensured. The pusher 69, after reaching the peripheral edge of the hearth, returns to its original position, and moves in the direction of the arrow for next discharge operation.

Production of reduced iron may be carried out by a method whereby reduced iron is discharged towards both sides of the hearth along a discharge guide fence provided on the hearth, and formed in the shape resembling the letter V based at the center across the hearth, and spread in the direction of advance of the hearth instead of the method by the pushout device described above.

Figure 11C:
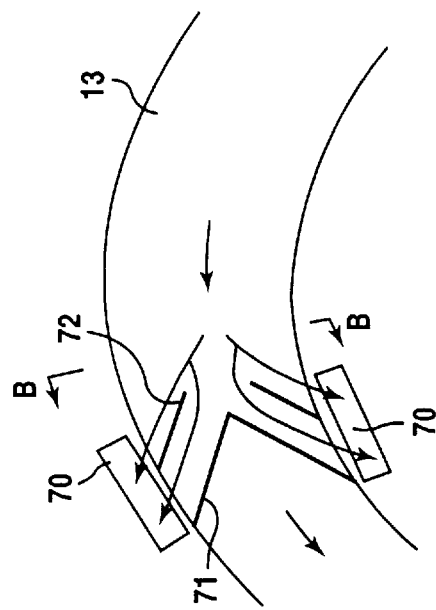
FIG. 11(c) is a top view illustrating another example of the method.

FIGS. 11(c) and (d) are views illustrating an example of the method. FIGS. 11(c) a schematic plan view, and FIGS. 11(d) is a cross-sectional view of FIGS. 11(c) at section B—B. As shown in the figures, a discharge guide fence 71 formed in the shape resembling the letter V, based at the center of the hearth 13 crosswise, and spreading in the direction of advance of the hearth 13 towards, is provided on the hearth, the spread on respective sides of V forming an angle of 45° with the direction of advance of the hearth.

When reduced iron transferred to the discharge area accompanying rotation of the hearth 13 reaches the discharge guide fence 71, reduced iron is split along the discharge guide fence 71 to the right and the left, and guided to discharge chutes 70 provided on both sides. In the example shown in the figure, supplementary guide fences 72 are provided before the discharge guide fence and in parallel therewith to smooth out discharge flow so that reduced iron 73 is discharged without stagnation.

There is no particular restriction on the angle at which the discharge guide fence is installed, however, from the viewpoint of discharging reduced iron rapidly out of the furnace without stagnation of reduced iron on the hearth, it is desirable to install the discharge guide fence to form 45° with the direction of advance of the hearth on respective sides thereof.

The discharge guide fence having a sufficient height so as not to permit reduced iron reaching the discharge area to go over before guided to the discharge chutes may be used.

With the method, reduced iron produced by firing in the rotary hearth furnace can be discharged rapidly out of the furnace, preventing a decline in metallization ratio due to reoxidation of reduced iron as described hereinbefore, and avoiding a decrease in heating area on the hearth resulting from installation of a cooling apparatus to prevent reoxidation so that productivity of reduced iron can be maintained.

In the conventional processes of producing reduced iron described in the foregoing, when charging agglomerates (pellets) into the rotary hearth furnace, powdering occurs to the agglomerates, generating fines. Even after charging, cracking occurs during reduction at a high temperature, generating fines. Fines thus generated are reduced into metallized iron powders (reduced iron fines) in the rotary hearth furnace. The reduced iron fines penetrate through gaps between the stopper fence installed in the discharge area and the hearth, stay on the hearth without being discharged, recycled to the feed inlet accompanying rotation of the hearth, and subjected to heating. Thus the reduced iron fines are circulated repeatedly, and stay on in the furnace.

The reduced iron fines staying in the furnace remain in powdery form for a while, however, after a length of time, reduced iron fines are sintered with each other, and stick to the hearth as adhesive matter. Before long, the hearth will be in a condition as if coated by a steel plate, and asperities are caused to occur on the surface of the hearth due to thermal deformation. With such asperities occurring on the surface of the hearth, irregularities in firing results when firing raw material with the result that not only deterioration in metallization ratio of reduced iron but also operational trouble may occur, posing a risk of major operational problems. Furthermore, iron adhered to the hearth bricks creates a cause for breakage of the bricks due to exfoliation when mechanical force is applied thereto.

In the method of producing reduced iron according to the invention, as the mixture of raw materials is charged into the reduction furnace after compacted into a sheet-like shape, generation of fines is far less than in the conventional method wherein raw material in the form of agglomerates is charged into the reduction furnace. Still, generation of fines is unavoidable as cracking occurs in the course of reduction at a high temperature. Hence, countermeasures to cope with the problem described above are required to maintain stable operation for a long time.

A method of removing reduced iron fines remaining on the hearth by blowing off with injected gas flow between the reduced iron discharge area and the raw material feeding inlet may be used as a countermeasure. "Between the reduced iron discharge area and the raw material feeding inlet" refers to an interval on the hearth from the reduced iron discharge area to the raw material feeding inlet along the direction of advance of the hearth, where neither raw material nor reduced iron produced therefrom is placed on.

Figure 12:
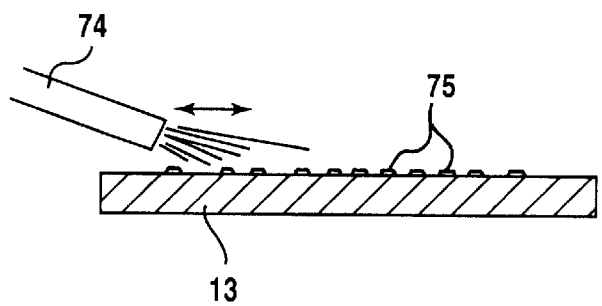
FIG. 12 is a view illustrating a method of removing reduced iron fines remaining on the hearth according to an embodiment of the invention.

FIG. 12 is a schematic illustration showing an example of the method. The figure show a section crossing the direction of advance of the hearth. As shown in the figure, a nozzle 74 for gas injection is disposed in a manner tilted downward towards the surface of the hearth, and remaining reduced iron 75 is blown off by gas injected from the nozzle 74, keeping the surface of the hearth clean.

There is no restriction on an angle formed between the nozzle and the surface of the hearth, and a height of the nozzle from surface of the hearth. Both may be adequately adjusted so as to blow off remaining reduced iron and effectively remove same from the surface of the hearth.

Gas may be injected towards the direction of advance of the hearth from the nozzles disposed side by side along the direction at right angles to the direction of advance of the hearth, however, it is desirable to inject gas towards the direction at right angles to the direction of advance of the hearth, or the direction substantially similar thereto from reciprocatingly movable nozzles by moving same as shown by the arrow in the figure.

In the case that the nozzle for gas injection is circular or substantially circular in section at the tip thereof, a plurality of the nozzles, instead of a single nozzle, may preferably be disposed in parallel around the periphery of the hearth. Nozzles flat and spreading in the direction of the circumference of the hearth in section at the tip thereof may also be used.

There is no particular restriction on the kind of gas injected, however, from the viewpoint of protection of the hearth bricks and prevention of reoxidation of remaining reduced iron fines, nitrogen gas is preferable.

Further, there is no restriction on injection pressure of gas, and the injection pressure may be adequately adjusted so as to be able to remove reduced iron from the hearth effectively.

Production of reduced iron may be carried out by use of a method of removing reduced iron remaining on the hearth by sweeping same out between the reduced iron discharge area and the raw material feeding inlet with brooms provided with a rotatable feather. In this context, "broom provided with a rotatable feather" refers to a device capable of sweeping out reduced iron remaining on the hearth, and is not limited to a broom having a feather or feather-like object. A broom provided with a hair-like object of a predetermined hardness and thickness (so called brush) or the equivalent may be used.

For example, a cylindrical broom surrounded by a cleaning brush and rotatable in one direction and reverse direction around the axis thereof (that is, rotatably reciprocating) may be used for the broom provided with the rotatable feather. The broom 76 provided with the rotatable cleaning brush as shown in an enlarged view of FIG. 13 corresponds to the aforesaid broom.

The remaining reduced iron is removed from the surface of the hearth by sweeping same out with such type of the broom provided with the rotatable feather, the broom being rotated in one direction or reverse direction as appropriate while reciprocatingly moved in the direction at right angles or substantially at right angles to the direction of advance of the hearth.

Figure 13:
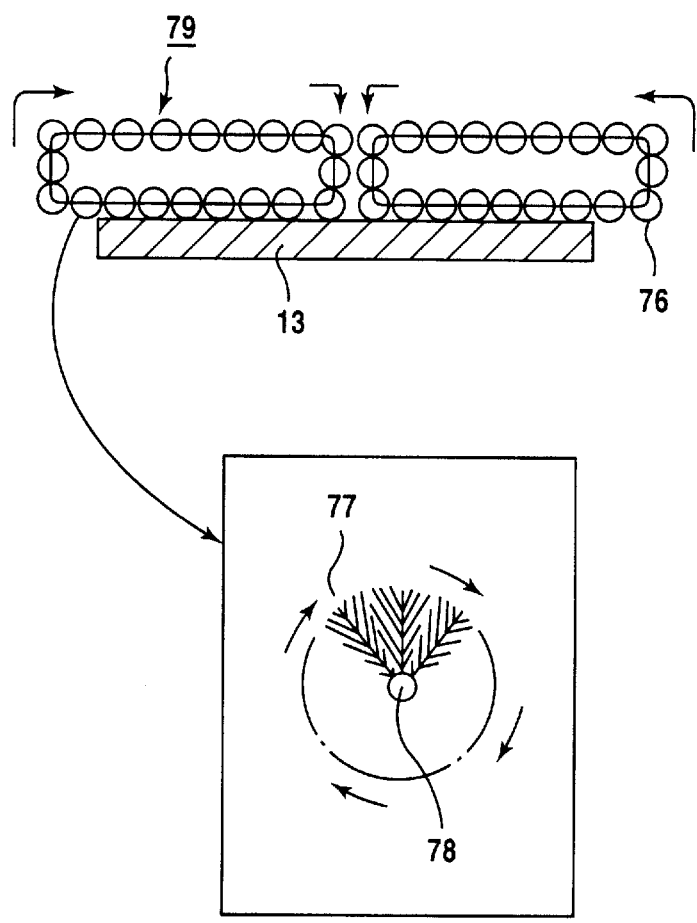
FIG. 13 is a view illustrating a method of removing reduced iron fines remaining on the hearth according to another embodiment of the invention.

FIG. 13 is a schematic illustration of the method according to an preferred embodiment of the invention, showing a vertical sectional view against the direction of advance of the hearth.

In this embodiment, for the broom provided with the rotatable feather, use is made of a plurality of groups 79 composed of cylindrical brooms 76 (refer to the enlarged view) provided with a cleaning brush 77 attached to the peripheral surface thereof and rotatable in one direction and reverse direction around the axis 78 thereof, which are grouped in annular fashion on a plane normal to the axis of the cylindrical broom 76. More specifically, a plurality (two in the figure) of groups 79 of the brooms 76 provided with the rotatable cleaning brush are disposed between the reduced iron discharge area and the raw material feeding inlet across the hearth 13, and the reduced iron remaining on the hearth is removed by rotating respective brooms 76 provided with the rotatable cleaning brush, composing each group 79, in one direction or reverse direction as appropriate while rotating each group 79 itself in annular ring in one direction or reverse direction at right angles or substantially at right angles to the direction of advance of the hearth. A group 79 in annular ring of the brooms 76 may be disposed on the hearth, and reciprocatingly moved in the direction crossing at right angles or substantially at right angles to the direction of advance of the hearth while being rotated as described above.

By use of the groups of the brooms provided with the rotatable cleaning brush, each in annular ring formation, the remaining reduced iron fines can be effectively removed in short time, keeping the surface of the hearth clean.

There is no particular restriction on the width of the brooms provided with the rotatable feather, however, the width same as that of the rotary hearth is preferable.

There is no particular restriction on a transfer speed of the broom provided with the rotatable feather, however, a speed same as or higher than that of the hearth is required provided that the entire surface of the hearth is to be cleaned by the brooms provided with the rotatable feather, having the width same as that of the hearth.

In case that reduced iron fines as well as adhesive matter remain on the hearth, production of reduced iron may preferably carried out by use of a method whereby the reduced iron fines and adhesive matter are removed by scraping same off with a scraper reciprocally movable in the direction crossing the direction of advance of the hearth between the reduced iron discharge area and the raw material feeding inlet, and having the lower edge kept in touch with the hearth.

Figure 14:
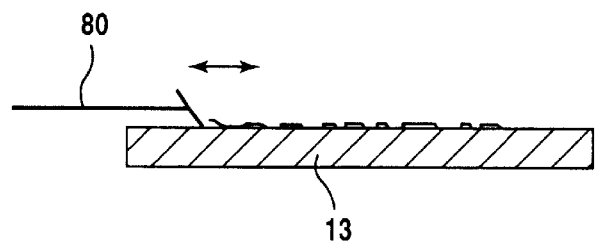
FIG. 14 is a view illustrating a method of removing reduced iron fines and adhesive matter remaining on the hearth according to yet another embodiment of the invention.

FIG. 14 is a schematic illustration of the method according to an embodiment of the invention, showing a vertical sectional view against the direction of advance of the hearth. As shown in the figure, the scraper 80 is disposed such that the lower edge thereof is kept in touch with the surface of the hearth and the scraper can make reciprocal movement in the direction crossing the direction of advance of the hearth 13. In this context, the direction crossing the direction of advance of the hearth refers to the direction intersecting the direction of advance of the hearth at right angles or substantially at right angles (direction forming plus 20° or less to the direction intersecting the direction of advance of the hearth at right angles or minus 20° or greater to same).

In the method, reduced iron fines and adhesive matter remaining on the hearth are scraped off and removed from the surface of the hearth by reciprocally moving the scraper in the direction crossing the direction of advance of the hearth. From the viewpoint of shortening a distance of movement, reciprocal movement in the direction at right angles to the direction of advance of the hearth may be preferable. As shown in the figure, the scraper with the end thereof tilted at an appropriate angle is effective in scraping off foreign matter, and can remove adhesive matter adhered to the hearth. A width of the scraper, substantially same as that of the hearth, is preferable.

Production of reduced iron may be carried out by use of a method whereby reduced iron remaining on the hearth is removed from the surface of the hearth by sucking same in through a suction hood provided between the reduced iron discharge area and the raw material feeding inlet.

Figure 15:
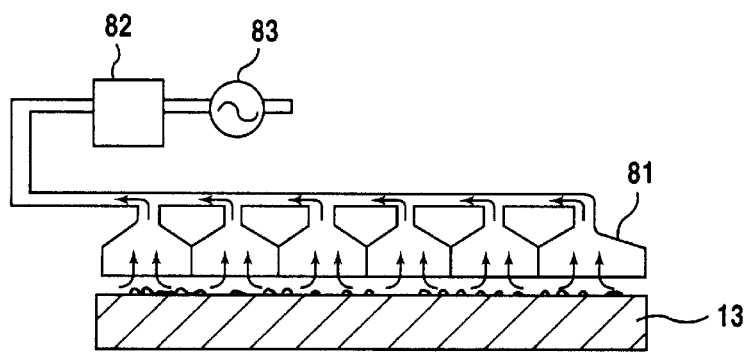
FIG. 15 is a view illustrating a method of removing reduced iron fines and adhesive matter remaining on the hearth according to further embodiment of the invention.

FIG. 15 is a schematic illustration showing a case of sucking in by use of a suction blower according to the method of the invention. The figure shows a vertical sectional view against the direction of advance of the hearth.

As shown in the figure, the suction hood 81 (partitioned into six compartments in the figure) is provided over the hearth between the reduced iron discharge area and the raw material feeding inlet, and the partitioned compartments are joined together into a single pipe and finally connected with a suction blower 83 via a bag filter 82. Reduced iron fines are sucked in by the suction blower 83 and recovered by the bag filter 82.

The suction hood may preferably be provided covering the whole width of the hearth.

In the case that reduced iron is discharged by the conventional type screw feeder instead of the aforesaid pushout device or the discharge guide fence in the shape of the letter V, use is preferably made of a method whereby a scraper type gate with the lower end thereof kept in contact with the hearth is provided immediately behind (as seen in the direction of advance of the hearth) the fixed stopper fence installed in the reduced iron discharge area to prevent reduced iron fines from remaining on the hearth.

Figure 16:
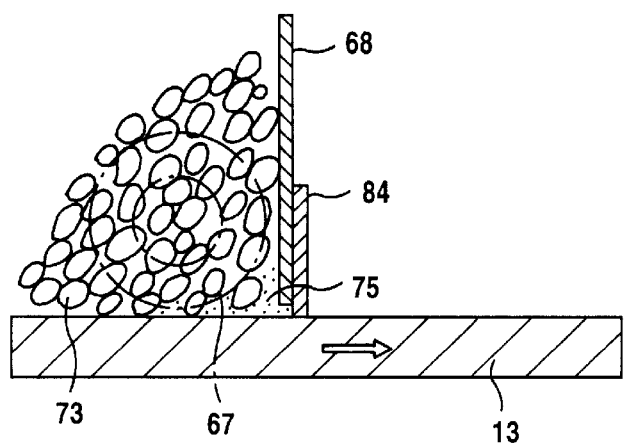
FIG. 16 is a view illustrating a method of preventing reduced iron fines from remaining on the hearth according to an additional embodiment of the invention.

FIG. 16 is a schematic illustration of the method according to an embodiment of the invention, showing a longitudinal sectional view in parallel with the direction (shown by the arrow in the figure) of advance of the hearth.

As shown in the figure, the scraper type gate 84 with the lower end thereof kept in contact with the hearth is provided in the direction of advance of the hearth of the fixed stopper fence 68 for storing reduced iron products, installed behind (on the downstream side) the screw feeder 67.

A small gap exists between the lower end of the fixed stopper fence 68 and the surface of the hearth, and increases in size gradually due to friction between reduced iron and the surface of the hearth during discharging of reduced iron. Consequently, reduced iron fines can pass through the gap, remaining on the hearth without being discharged, and subjected to heating after returning to the raw material feeding inlet accompanying rotation of the hearth. While such circulation is repeated, reduced iron fines stay on inside the rotary hearth furnace. To cope with this problem, the scraper type gate 84 is provided behind the fixed stopper fence 68. The scraper type 84 gate is disposed so as to be lightly pressed down and kept in contact with the surface of the hearth 13, closing the gap. Therefore, reduced iron fines passing through the gap between the fixed stopper fence 68 and the surface of the hearth are blocked by the scraper type gate 84, and reduced iron fines 75 are prevented from remaining on the hearth, maintaining the surface of the hearth clean.

The scraper type gate 84 may preferably be installed immediately behind the fixed stopper fence 68, that is, in intimate contact with the fixed stopper fence 68 as shown in the figure provided that the scraper type gate can be kept lightly pressed down without any difficulty. Further, in case that the gap between the fixed stopper fence 68 and the surface of the hearth varies in height in the direction crossing the hearth, the scraper type gate is preferably divided across the width of the hearth.

With the method, the hearth can be kept clean by forestalling reduced iron fines from remaining on the hearth.

The method of producing reduced iron according to the invention is carried out with ease by use of the apparatuses according to the invention hereinbefore described, fully demonstrating features of the invention.

The method of producing hot metal according to the invention (the invention under (3) and (4) above) is the method whereby hot metal is produced using reduced iron in hot condition produced by the method according to the invention under (1) above. The method (3) relates to the case of using the shaft furnace, and the method (4) relates to the case of using the in-bath smelting furnace.

The aforesaid methods are same as the invention (1) with respect to the steps of mixing raw materials and reduction, that is, from the step a) to step d) in the invention (3) and (4) as described in DISCLOSURE OF THE INVENTION, and various embodiments described above adopted by the invention (1) may be used singly or in combination.

Accordingly, the steps from e) to g) are described hereinafter.

The step e) relates to a process of discharging reduced iron obtained by the reduction step [referred to as pre-reduction step in the method of producing hot metal according to the invention (3) and (4)], at a temperature not less than 500° C., from the pre-reduction furnace.

The reason for setting the discharge temperature at not less than 500° C. is that at this temperature or higher, melting rate of reduced iron is increased by making full use of heat of reduced iron for the succeeding step of melting, and energy efficiency for the whole process is improved while production facilities are economized. However, when a temperature inside the sheet-like compact is at not less than 1170° C. on discharge, there is a possibility of liquid melt being present inside the sheet-like compact posing a risk of trouble in discharge operation. Hence, it is desirable to stop heating so that the temperature inside the sheet-like compact declines below 1170° C. before discharging from the furnace. For a method of lowering the temperature inside the sheet-like compact below 1170° C. in short time, various methods such as method of blowing a reducing gas at an ambient temperature, an inert gas, for example, nitrogen gas, and the like onto the surface of the sheet-like compact, a method of bringing a water-cooled plate in contact with the surface of the sheet-like compact, or the equivalent may be used.

The next step f) relates to a process of reduction and melting. In the method of producing hot metal according to the invention (3), the shaft furnace is used.

Figure 17:
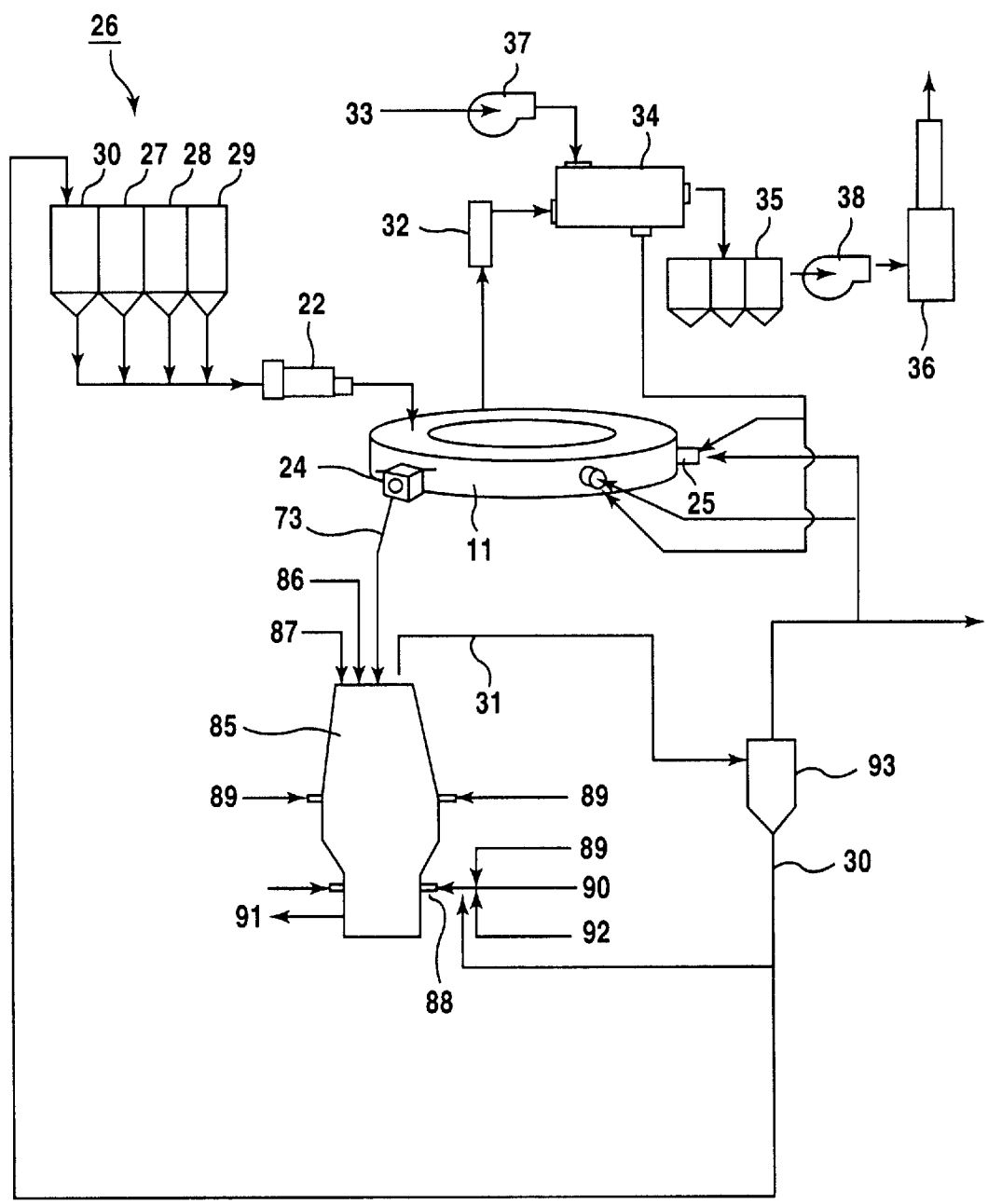
FIG. 17 is a schematic illustration showing a method of producing hot metal in a shaft furnace, and a facility for carrying out the method.

FIG. 17 is a schematic illustration showing the steps of the method of producing hot metal according to the invention (3) and the apparatuses used for carrying out the method. As shown in the figure, reduced iron in hot condition is continuously discharged from the discharge outlet 24 of the rotary hearth furnace 11, and sent out to the shaft furnace 85 for the step of reduction and melting.

In the case that the shaft furnace is located at a distance, reduced iron is transported in a closed container (not shown) with inert gas such as nitrogen gas sealed therein. Normally, however, the shaft furnace is installed adjacent to the rotary hearth furnace, which is a pre-reduction furnace, and reduced iron is fed into the shaft furnace by a bucket conveyer or the like through an enclosed passage filled with inert gas such as nitrogen or reducing gas such as off-gas from the shaft furnace. Since reduced iron is sintered in the shape of a plate upon completion of pre-reduction, same may be transported by a conveyer after light and rough crushing.

In the step of reduction and melting, reduced iron in hot condition, lumpy carbon material (coke, coal, and the like) 86, and flux 87 for adjusting basicity of slag are charged into the shaft furnace from the top thereof, wherein a carbon material filled layer is laid, and a reducing gas at a high temperature is generated through combustion of the carbon material placed in front of the tuyeres 88, through which oxygen-containing gas (for example, air 89) or oxygen 90 is blown in. After reduction and melting, hot metal and slag 91 are discharged from the tap hole provided in the lower part of the furnace.

A furnace used for smelting in the method according to the invention is the shaft furnace as above wherein a combustion zone in front of the tuyeres is surrounded by the carbon material as in the case of the blast furnace, and consequently, breakage of refractory bricks due to exposure to high temperatures is prevented. Further, as opposed to the case of the method disclosed in Japanese Patent Publication No. H 3-60883 wherein molten iron bath in the smelting furnace is agitated, the shaft furnace used in the method is effective in lengthening the life of refractory bricks because there is no agitation in molten iron bath inside the shaft furnace.

Further, as reducing atmosphere in the shaft furnace wherein the carbon material filled layer is formed is as strong as that in the case of the blast furnace, sulfur content in hot metal can held down low, producing high quality hot metal while concentration of FeO can be kept as low as in the case of the blast furnace, contributing to restraining depletion of refractory bricks.

In terms of thermal efficiency too, high thermal efficiency is ensured by the method because counter-current heat transfer takes place between gas and solids (charged raw material) in the shaft furnace, from the top of which carbon material and reduced iron are charged as in the case of the blast furnace. In the case of using cokes for carbon material, as shown in the figure, consumption of cokes may be reduced by blowing in carbon-bearing material 92 through the tuyeres 88, and blowing in air 89 through the sidewall above the tuyeres so that heat generated by combustion of CO gas and $H_2$ gas can be used for melting of reduced iron.

Dust generated from the shaft furnace may be used within the facility.

In the example shown in FIG. 17, dust 30 and the equivalent are blown in through the tuyeres 88 of the shaft furnace 85 while same is used in the rotary hearth furnace 11 as a part of raw material. Such recycling contributes to improvement in utilization efficiency of raw material and fuel while waste disposal becomes unnecessary without emission of dust, and the like outside the facility, making the method advantageous from the standpoint of cost and environmental protection.

In the method of producing hot metal according to the invention (4) above, the in-bath smelting furnace is used in the step of reduction and melting.

Figure 18:
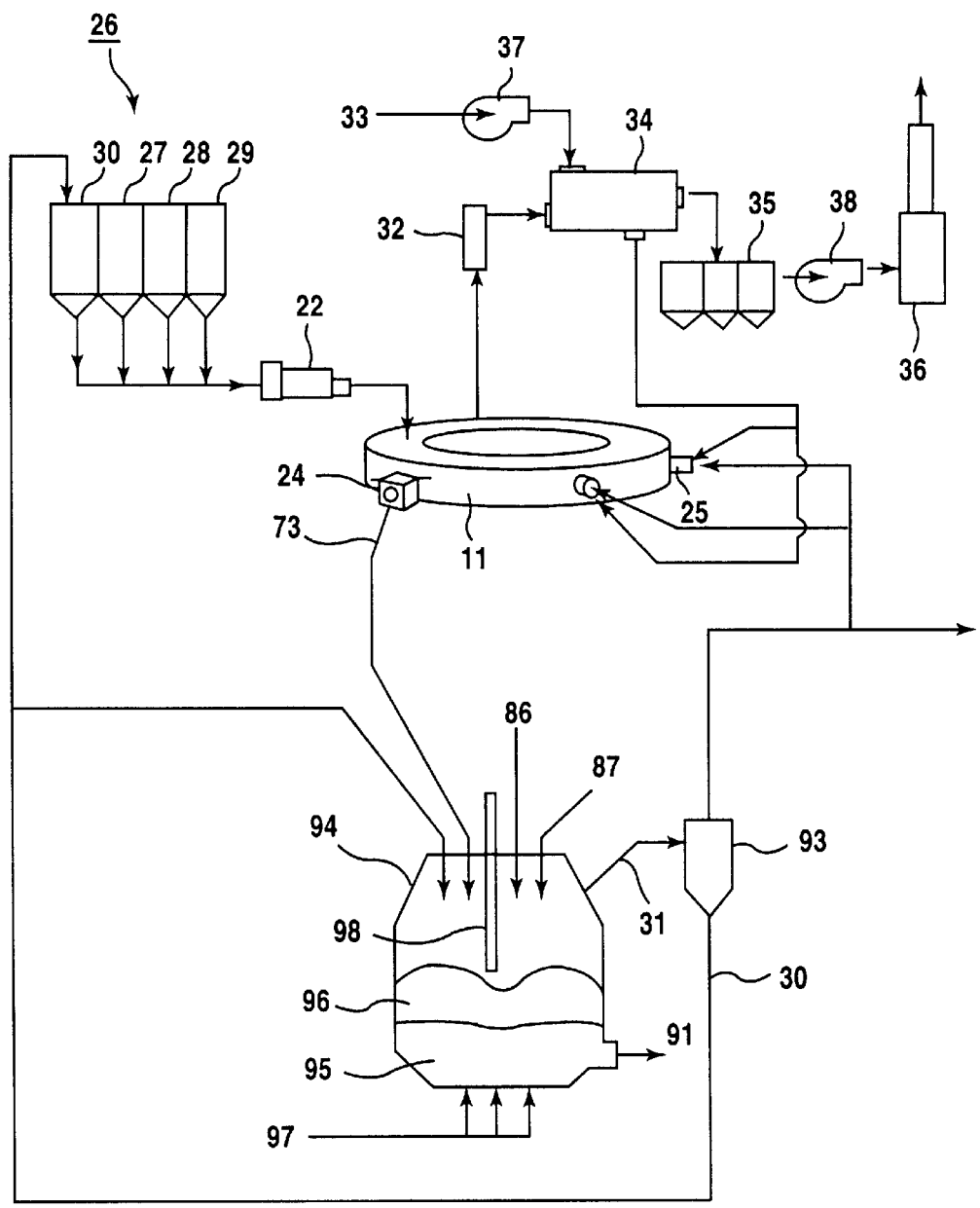
FIG. 18 is a schematic illustration showing a method of producing hot metal in a in-bath smelting furnace, and a facility for carrying out the method.

FIG. 18 is a schematic illustration showing the steps of the method of producing hot metal according to the invention (4) and the apparatuses used for carrying out the method. As shown in the figure, reduced iron 73 in hot condition is continuously discharged from the discharge outlet 24 of the rotary hearth furnace 11, and sent to the next step of reduction and melting to be carried out in the in-bath smelting furnace 94.

In the case that the in-bath smelting furnace is located at a distance, reduced iron is transported in a closed container with inert gas such as nitrogen as in the case of the shaft furnace. Normally, however, the in-bath smelting furnace is installed adjacent to the rotary hearth furnace, which is a pre-reduction furnace, and reduced iron is fed into the in-bath smelting furnace by a bucket conveyer or the like through an enclosed passage filled with inert gas such as nitrogen or reducing gas such as off-gas from the in-bath smelting furnace. Since reduced iron is sintered and in the shape of a plate upon completion of pre-reduction, same may be transported by a conveyer after light and rough crushing.

In the step of reduction and melting, reduced iron 73 in hot condition, carbon material 86, and flux 87 for adjusting basicity of slag are charged into the in-bath smelting furnace 94 from the top thereof, wherein molten iron bath 95 and molten slag bath 96 are present and a gas for agitation 97 is blown in from the bottom thereof for agitation of the molten iron bath and molten slag bath while oxygen is supplied from the top side via a water cooled lance 98. After reduction and melting, hot metal and slag 91 are discharged from the tap hole provided in the lower part of the furnace.

In the in-bath smelting furnace, reduced iron, ash content in carbon material, and flux are melted by heat generated by combusting carbon material charged into the furnace from the top thereof, and further combusting CO gas generated through reduction of unreduced iron oxides contained in reduced iron and a portion of combustible gases issued from carbon material while the unreduced iron oxides contained in reduced iron is reduced by the carbon material. The combustible gases issued from the carbon material are CO gas, $H_2$ gas, and the like. In this instance, heat required for reduction of iron oxides, and also, carbon required for curburizing into the molten iron bath are supplied.

Generally, coal is used for carbon material, and burnt lime or dolomite, or the like are used for flux.

The in-bath smelting furnace is quite advantageous in that as cokes are not used therein as opposed to the case of the blast furnace, hard coking coal is not required with the result that it can do without coke ovens requiring huge capital outlay, and under operational constraint from environmental considerations.

Dust 30, and the like generated from the in-bath smelting furnace may be used within the facility. In the example shown in FIG. 18, generated dust is charged into the in-bath smelting furnace 94 from the top side while being used for a part of raw material charged into the rotary hearth furnace. Such recycling contributes to improvement in utilization efficiency of raw material and fuel while waste disposal becomes unnecessary without emission of dust, and the like outside the facility, making the method advantageous from the standpoint of cost and environmental protection.

The step (g) relates to a process of gas recovery whereby gases generated in the shaft furnace or the in-bath smelting furnace are recovered while a portion of the gases is supplied to the pre-reduction furnace as fuel for pre-reduction. More specifically, as shown in FIGS. 17 and 18, generated gases (off-gas 31) are recovered after removal of dust, and the like through a dust collector 93 such as cyclone or the like. The recovered gases are sent to downstream steps or used for power generation.

Thus, in the method of producing hot metal according to the invention (3) or (4), redeced iron is produced through rapid reduction of ferrous raw material in fine form charged in the pre-reduction furnace, and high quality hot metal is produced by charging the reduced iron in hot condition into the shaft furnace or the in-bath smelting furnace, and melting same at high thermal efficiency.

Example 1

Powder ferrous raw material, coal (fine powder coal) as powder solid reductant and bentonite (binder) each of a composition shown in Table 1–Table 3 were prepared. Table 4 shows the grain size constitution of the powder ferrous raw material and the coal.

TABLE 1

| | Chemical composition (mass %) | | | | | | |
|---|---|---|---|---|---|---|---|
| | T. Fe | $Fe_2O_3$ | $Fe_3O_4$ | FeO | Zn | C | Slag ingredient | L. O. I. |
| Iron ore A | 67.5 | 96.3 | 0.0 | 0.2 | 0.006 | 0.0 | 3.5 | 0.4 |
| Iron ore B | 66.0 | 0.0 | 82.4 | 8.2 | 0.003 | 0.0 | 9.4 | 0.0 |
| Iron work dust | 31.3 | 38.7 | 0.0 | 5.4 | 1.9 | 30.2 | 23.8 | 0.0 |
| Mill scale | 73.8 | 0.0 | 1.9 | 93.2 | 0.005 | 0.0 | 4.9 | 0.0 |

TABLE 1-continued

| | Chemical composition (mass %) | | | | | | |
|---|---|---|---|---|---|---|---|
| | T. Fe | $Fe_2O_3$ | $Fe_3O_4$ | FeO | Zn | C | Slag ingredient | L. O. I. |

(Note)
L. O. I. means loss on ignition

TABLE 2

| | Chemical composition (mass %) | | | |
|---|---|---|---|---|
| | Fixed carbon | Volatile ingredient | Ash | Total carbon |
| Coal | 64.8 | 25.8 | 9.4 | 78.5 |

TABLE 3

| | Composition (mass %) | | |
|---|---|---|---|
| | Gangue mineral | $Fe_2O_3$ | L. O. I. |
| Bentonite | 78.5 | 15.4 | 6.1 |

(Note)
L. O. I. means loss on ignition

TABLE 4

| | Grain size constitution after grain size control |
|---|---|
| Iron ore A | −325 mesh: 90 mass % |
| Iron ore B | −325 mesh: 90 mass % |
| Iron work dust | −0.5 mm: 90 mass % |
| | −0.05 mm: 30 mass % |
| Mill scale | −3 mm: 90 mass % |
| | −1 mm: 50 mass % |
| Coal | −200 mesh: 75 mass % |
| | −325 mesh: 60 mass % |

After mixing them in blending ratios shown in Table 5, the mixed raw materials were formed into sheet-like compacts each of 15 mm thickness and 500 mm width and into sheet-like compacts having the same width but having uneven shape on the surface as shown in FIG. 3 by a shaping and charging device shown in FIG. 2.

Further, for the comparison, a portion of the mixed raw materials was pelletized into green pellets of 18 mm diameter by a pan type pelletizer, and then heated to 115° C., into dry pellets with 90% or more of water content being removed.

TABLE 5

| | Raw waterial blending ratio (mass %) | | | | | | |
|---|---|---|---|---|---|---|---|
| | Iron ore A | Iron ore B | Iron work dust | Mill scale | Coal | Bentonite | Water added |
| Mixed raw material F | 71.5 | — | — | — | 19.0 | 1.5 | 8.0 |
| Mixed raw material Q | — | 72.0 | — | — | 18.5 | 1.5 | 8.0 |
| Mixed raw material R | 58.6 | — | 13.4 | — | 18.5 | 1.5 | 8.0 |

TABLE 5-continued

| | Raw waterial blending ratio (mass %) | | | | | |
|---|---|---|---|---|---|---|
| | Iron ore A | Iron ore B | Iron work dust | Mill scale | Coal | Bentonite | Water added |
| Mixed raw material S | — | — | 25.7 | 47.5 | 17.3 | 1.5 | 8.0 | compacts. Further, it is advantageous to blow the oxygen-containing gas into the furnace after preheating the gas to about 500 to 600° C. by heat exchange with the exhaust gas.

In the reduction test, the aimed value for the metallizing ratio was set to 92% and a reduction time capable of attaining the aimed value was measured. The results are also shown in Table 6.

TABLE 6

| | | Mixed material: type | Mixed material: shape | Formation of unevenness on the compact surface | Powder solid reductant, disposed thinly on hearth | Direct blowing of oxygen-containing gas to the compact surface | Mean furnace temperature (° C.) | Reduction time (min) | Metallizing ratio (%) |
|---|---|---|---|---|---|---|---|---|---|
| This invention | Case 1 | Mixed raw material P | Sheet-like compact | non | non | non | 1300 | 15 | 92.0 |
| | Case 2 | Mixed raw material P | Sheet-like compact | yes | non | non | 1300 | 15 | 91.7 |
| | Case 3 | Mixed raw material P | Sheet-like compact | non | yes | non | 1300 | 15 | 92.9 |
| | Case 4 | Mixed raw material P | Sheet-like compact | non | non | yes | 1300 | 12 | 91.6 |
| Comp. example | Case 5 | Mixed raw material P | Pellet | — | non | yes | 1300 | 10 | 92.0 |
| This invention | Case 6 | Mixed raw material Q | Sheet-like compact | non | non | yes | 1300 | 11 | 92.2 |
| | Case 7 | Mixed raw material R | Sheet-like compact | yes | non | yes | 1300 | 12 | 92.0 |
| | Case 8 | Mixed raw material S | Sheet-like compact | yes | non | yes | 1300 | 11 | 91.9 |

Figure 19A:
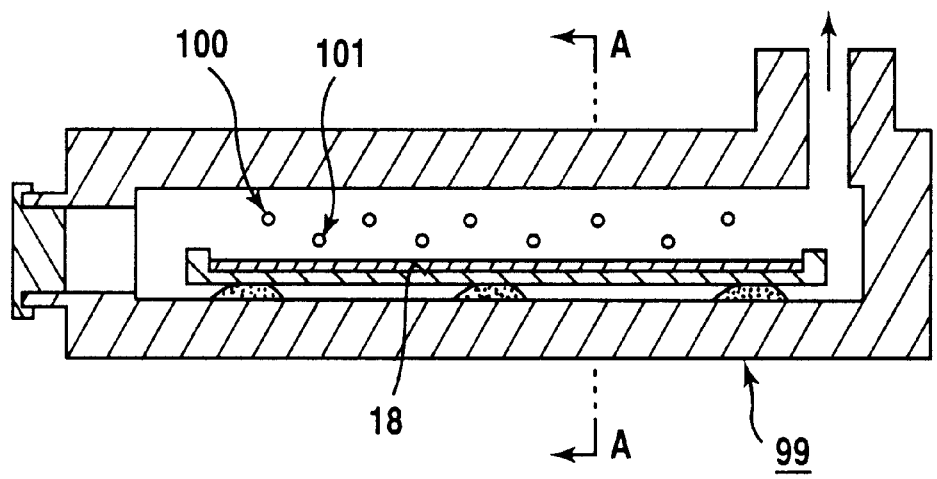
FIG. 19 is a view illustrating a test furnace for high temperature reduction used in carrying out a test an example.
Figure 19B:
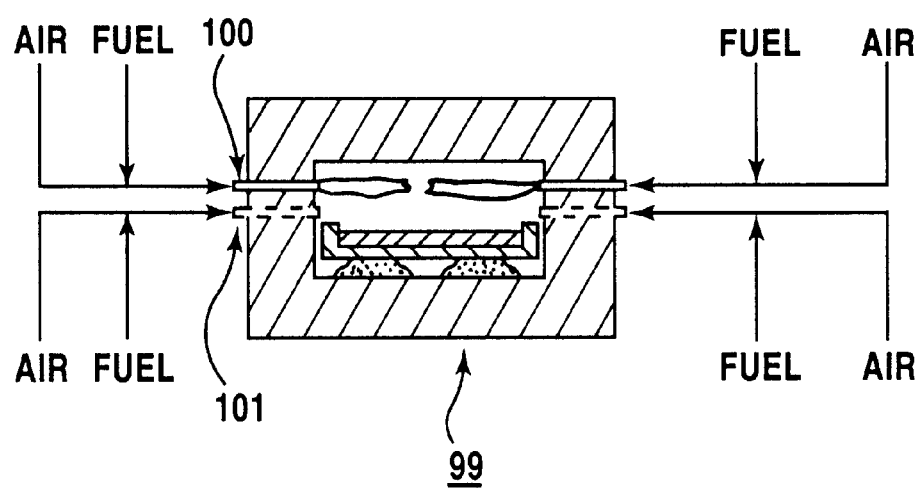

The compacts and pellets were put to reducing test under the conditions shown in Table 6 by using a small-sized high temperature heating-reduction test furnace shown in FIG. 19(a) is a schematic vertical cross sectional view and FIG. 19 which is a cross sectional view taken along arrow A—A in (a). In Table 6, "mean temperature in the furnace" is a mean gas temperature in a furnace space after stopping blowing of oxygen-containing gas to the surface of the compacts or pellets.

As shown in FIG. 19, burners are disposed in two upper and lower stages in a high temperature heating reduction test furnace 99, and burners of the lower stage 101 are used for blowing air as oxygen-containing gas to the surface of compacts or pellets only for a period while burnable volatile ingredients are released from the powder solid reductant, thereby burning the burnable volatile ingredients. Use of the lower stage burners 101 was interrupted at the instance the release of the burnable volatile ingredients ended. On the other hand, upper stage burners 100 are heating burners for keeping the furnace temperature to a predetermined temperature.

The burners are disposed in two upper and lower stages since the test furnace is a fixed type. In a case of a rotary hearth furnace, the burners may not be arranged in the two stages but may be in one stage. Namely, in the rotary hearth furnace, it may suffice to set the angle of burners disposed in the generation section of burnable volatile ingredients situated downstream of a charging portion for the compacts such that the oxygen-containing gas hits on the surface of the The test was at first conducted under the conditions of case 1. As a result, it could be confirmed that 92% of metallizing ratio could be attained without pelletization if about 15 min was taken for the reduction time. This shows that the reduction time may be extremely shorter compared with about 8 to 10 hours of reduction time in a case of a shaft furnace type direct reduction system using a reduction gas obtained by modifying usual natural gas.

Case 2 show an example in which the upper surface of the sheet-like compact was made uneven. While the reduction time was substantially identical with case 1, since the amount of the raw material loaded per unit area of the hearth was increased by about 1.9 times, it was confirmed that the productivity was increased also to about 1.9 times. This is considered to be attributable to the increase of the heat receiving area due to the unevenness formed on the upper surface of the sheet-like compact and to the improvement of the temperature elevation rate since the protruded portions are heated from both surfaces although the amount of the raw material powder loaded per unit area of the hearth was increased to about 1.9 times.

Case 3 is an example in which a sheet-like compact was disposed on the powder solid reductant laid thinly on the hearth and then put to high temperature reduction. While it was observed that reduced iron was slightly adhered on the hearth in other cases, adhesion of reduced ore was not observed at all in the present case.

Case 4 is an example of charging the sheet-like compact into the furnace, then supplying air to the surface of the sheet-like compact only for about 2 min in which burnable volatile ingredients in the coal continued are kept to be released and burning the burnable volatile ingredients released from the coal also on the surface of the sheet-like compact. As a result, the reduction time was further shortened by 3 min from 15 min in case 1 to 12 min and it could be confirmed the merit of heating and elevating temperature while taking place combustion of the burnable volatile ingredients released from the sheet-like compact also on the surface of the sheet-like compact.

Case 5 is an example of using conventional dry pellet. The reduction time was 10 min which was somewhat shorter compared with the case 4. It is considered that while the pellets were used after drying, the sheet-like compact was used as it is not dried. However, in a case of using the pellet, since it requires drying for a relatively long period of time at the outside of the furnace, the processing time was consumed so much and this can not be said advantageous. Accordingly, it can be said that the method of the present invention using the powder raw material in the form of the sheet-like compact is a reduction method comparable with the case of using the pelletized material.

Case 6 is an example of using ore B (iron oxide in the formed of magnetite) shown in Table 1. The reduction time was 11 min, which was somewhat shorter compared with case 4 (using ore A with the iron oxide in the form of hematite). This is assumed that while both reduction of magnetite and hematite into metallic iron are endothermic reductions, the reaction heat per iron atom is smaller in the magnetite by about 4760 kcal/kmol, so that temperature lowering is small in the compact and, as a result, the reduction reaction was promoted.

Case 7 is an example of using ferrous raw material comprising ore A blended with igron work dust. Case 8 is an example of using ferrous raw material comprising dust and mill scale blended therewith. The reduction time in each of the cases was about 12 min and 11 min, which was substantially identical with the case 4 of using iron ore.

Further, dezinc ratio in case 7 using Zn-containing dust was about 92% and the dezinc effect according to the method of the present invention could be confirmed.

It is considered that although the mixed raw material S was somewhat coarser, the reduction time was not changed so much in case 8, because iron oxide in the mixed raw material S was FeO and the reduction ratio was about 30% on the basis of $Fe_2O_3$, so that the reduction amount down to the metallic iron may be smaller as well as that the amount of endothermic reduction per iron atom from FeO into metallic iron is decreased by about 20590 kcal/kmol compared with the case of $Fe_2O_3$ and the temperature lowering in the sheet-like compact was small and, as a result, the reduction reaction was promoted.

Example 2

Powder iron ore and coal (fine powder coal) as the powder solid reductant having the composition and the grain size constitution as shown in Table 7–Table 9 blended in a blending ratio shown in Table 10 was prepared.

TABLE 7

| Kind of powder ferrous raw material | Chemical composition (mass %) | | | | | |
|---|---|---|---|---|---|---|
| | T. Fe | $Fe_2O_3$ | $Fe_3O_4$ | FeO | Slag ingredient | L. O. I. |
| Iron ore | 67.5 | 96.3 | 0.0 | 0.2 | 2.0 | 0.4 |

(Note)
L. O. I. means loss on ignition

TABLE 8

| Kind of powder solid reductant | Chemical composition (mass %) | | | |
|---|---|---|---|---|
| | Fixed carbon | Volatile ingredient | Ash | Total carbon |
| Coal | 64.8 | 25.8 | 9.4 | 78.5 |
| Coke | 88.0 | 0.2 | 11.0 | 88.7 |

TABLE 9

| | Grain size constitution after grain size control |
|---|---|
| Iron ore | −325 mesh: 90 mass % |
| Coal | −200 mesh: 75 mass % |
| | −325 mesh: 60 mass % |
| Coke | 10~30 mm: 30 mass % |
| | 30~60 mm: 70 mass % |

TABLE 10

| Raw material blending ratio (mass %) | | |
|---|---|---|
| Iron ore | Coal | Total |
| 79.7 | 20.3 | 100.0 |

As the test facility, a small-sized molten iron manufacturing test facilities described above shown in FIG. 17 was used. That is the facility comprises a rotary hearth furnace 11 as a preliminary reduction furnace, a shaft furnace 85 as a smelting furnace and a raw material receiving hopper 26, a mixer 22 and a waste heat recovery heat exchanger 34 and the like.

Powder ore 27, reductant 28 (fine powder coal) and a binder 29 received in a raw material receiving hopper 26 were taken out each by a predetermined amount from respective hoppers and charged in the mixer 22, sufficiently mixed with addition of a small amount of water and then the mixture was charged into the rotary hearth furnace.

The mixture was charged into the hearth by compacting them into a sheet-like shape by the shaping/charging device shown in FIG. 2 and then placing on the hearth. The thickness of the sheet-like compact was defined to 15 mm.

Air, including combustion air, was used after preheating to 600° C. by heat exchange with exhaust gas from the rotary hearth furnace. After the end of the evolution of the burnable volatile ingredients, the average gas temperature in the furnace space was set to about 1300° C. Further, the aimed value for the metallizing ratio of reduced iron was defined to 92%.

The reduced iron obtained from the rotary hearth furnace 11 was taken out at about 1150° C. to the outside of the furnace, slightly pulverized coarsely and then charged from above the shaft furnace 85. Coke 86 was charged together with lime stone 87 from above the shaft furnace. The lime stone was used in such an amount so as to provide the basidity of slag at 1.25.

In addition to the case of blowing air 89 and oxygen 90 from tuyeres 88, a case of blowing fine powder coal 92 to thereby reduce the consumption amount of coke which is more expensive compared with the fine powder coal was also studied.

Molten iron was discharged together with slags from a tap hole disposed to a lower portion of the furnace.

The exhaust gas 31 from the shaft furnace 85 was removed with dust by a cyclone 93 and a portion thereof was blown from a burners 25 as fuel used in the rotary hearth furnace 11, while other portions were recovered as fuel for other facilities.

The test was conducted on six cases shown in Table 11.

case 2, since the amount of the raw material loaded per unit area of the hearth was increased by about 1.9 times, it was confirmed that the productivity was increased also to about 1.9 times. This is considered to be attributable to the increase of the heat receiving area due to the unevenness formed on the upper surface of the sheet-like compact and to the improvement of the temperature elevation rate since the protruded portions are heated from both surfaces although the amount of the raw material powder loaded per unit area of the hearth was increased to about 1.9 times.

In the cases 1–4 above, oxygen enriched air at a normal temperature was used for the blowing condition, operation was conducted at a theoretical burning temperature before the tuyeres of 2,500° C., and reduced iron at about 650° C. was charged into the shaft furnace thereby enabling to produce molten iron of good quality containing 4.6 wt % C and 0.02 wt % sulfur.

TABLE 11

| Furnace | Item | | Case 1 | Case 2 | Case 3 | Case 4 | Case 5 | Case 6 |
|---|---|---|---|---|---|---|---|---|
| Preliminary reduction furnace | Placing of mixture on the preliminary reduction furnace hearth | | Pellet used | Sheet-like | Sheet-like | Sheet-like | Sheet-like | Sheet-like |
| | Powder solid reductant, laid thinly on hearth | | — | — | Practiced | — | — | — |
| | Unevenness formed on the upper surface of the sheet-like compact | | — | — | — | Practiced | — | — |
| | Ore | (kg/pt) | 1370 | 1370 | 1370 | 1370 | 1370 | 1370 |
| | Air preheating temperature | (° C.) | 600 | 600 | 600 | 600 | 600 | 600 |
| | Amount of air | (Nm³/pt) | 1789 | 1743 | 1743 | 1621 | 1739 | 1764 |
| | Amount of smelting furnace exhaust gas used | (Nm³/pt) | 404 | 404 | 404 | 404 | 404 | 241 |
| | Reduction time in preliminary reduction furnace | (min) | 10 | 15 | 15 | 15 | 15 | 15 |
| | Metallizing ratio of reduced iron | (%) | 92.0 | 92.0 | 92.0 | 91.8 | 92.0 | 92.0 |
| | Reduced iron discharging temp. | (° C.) | 1150 | 1150 | 1150 | 1150 | 1150 | 1150 |
| | Securing of Reduced iron to hearth | | Scured slighly | Scured slighly | Not at all | Scured slighly | Scured slighly | Scured slighly |
| Smelting furnace | Reduced iron discharging temp. | (° C.) | 650 | 650 | 650 | 650 | 650 | 650 |
| | Coke | (kg/pt) | 341 | 341 | 341 | 312 | 287 | 107 |
| | Fine powder coal | (kg/pt) | 0 | 0 | 0 | 0 | 0 | 329 |
| | Fuel | (kg/pt) | 341 | 341 | 341 | 312 | 287 | 436 |
| | Oxygen | (Nm³/pt) | 126 | 129 | 129 | 116 | 72 | 265 |
| | Air | (Nm³/pt) | 562 | 566 | 566 | 509 | 622 | 47 |
| | Air temperature | (° C.) | 25 | 25 | 25 | 25 | 600 | 600 |
| | Molten iron temperature | (° C.) | 1500 | 1500 | 1500 | 1500 | 1500 | 1500 |
| | Molten iron [C] | (%) | 4.6 | 4.6 | 4.6 | 4.6 | 4.6 | 4.6 |
| | Molten iron [S] | (%) | 0.02 | 0.02 | 0.02 | 0.02 | 0.02 | 0.02 |
| | Slag | (kg/pt) | 168 | 168 | 168 | 163 | 159 | 178 |
| | Slag basidity | (—) | 1.25 | 1.25 | 1.25 | 1.25 | 1.25 | 1.25 |

(Note)
"Sheet-like" means Sheet-like compact

Case 1 indicates a test in a case of pelletting a raw material mixture by an existent method in which the reduction time in the rotary hearth furnace was 10 min.

Case 2 shows an example of compacting the raw material mixture into a sheet-like shape and it was confirmed that reduced iron of 92% metallizing ratio was obtained if the reduction time was set to about 15 min. This shows that the reduction time may be extremely shorter compared with about 8 to 10 hours of reduction time in a case of a shaft furnace type direct reduction system using reduction gas obtained by modifying usual natural gas.

Case 3 is an example in which a sheet-like compact was disposed on the powder solid reductant laid thinly on the hearth and then put to high temperature reduction. While it was observed that reduced iron was slightly adhered on the hearth in other cases, adhesion of reduced ore was not observed at all.

Case 4 show an example in which the upper surface of the sheet-like compact was made uneven as shown in FIG. 3. While the reduction time was substantially identical with Case 5 is an example of blowing air while heating to about 600° C., in which the amount of oxygen used was reduced to 57 Nm³/pt compared with the case 2 and the combustion ratio of the shaft furnace was also lower and the effect could be confirmed.

Case 6 shows an example of blowing fine powder coal to the tuyeres. Although the combustion ratio was increased slightly, the coke ratio was lowered to 170 kg/pt, which was reduced to about ⅓ compared with other cases, and the effect could be confirmed.

Example 3

Powder iron ore, coal (fine powder coal) as the powder solid reductant having the composition and the grain size constitution as shown in Table 7–Table 9 used in Example 2, and bentonite shown in Table 3 used in Example 1 blended in a blending ratio shown in Table 12 was prepared.

TABLE 12

| Raw material blending ratio (mass %) | | | |
|---|---|---|---|
| Iron ore | Coal | Bentnaite | Total |
| 75.7 | 19.3 | 5.0 | 100.0 |

As the test facility, a small-sized molten iron manufacturing test facilities described above shown in FIG. 18 was used. That is the facility comprises a rotary hearth furnace 11 as a preliminary reduction furnace, a in-bath smelting furnace 94 as a smelting furnace and a raw material receiving hopper 26, a mixer 22 and a waste heat recovery heat exchanger 34 and the like.

Fine iron oxide 27 (powder iron ore), reductant 28 (fine powder coal) and a binder 29 received in a raw material receiving hopper 26 were taken out each by a predetermined amount from respective hoppers and charged in the mixer 22, sufficiently mixed with addition of a small amount of water and then the mixture was charged into the rotary hearth furnace.

The mixture was charged into the hearth by compacting it into a sheet-like shape by the shaping/charging device shown in FIG. 2 and then placing on the hearth. The thickness of the sheet-like compact was defined to 15 mm.

Air, including combustion air, was used after preheating to 600° C. by heat exchange with an exhaust gas from the rotary hearth furnace. After the end of the evolution of the burnable volatile ingredients, the average gas temperature in the furnace space was set to about 1300° C. Further, the aimed value for the metallizing ratio of reduced iron was defined to 92%.

The reduced iron obtained from the rotary hearth furnace 11 was taken out at about 1150° C. to the outside of the furnace, slightly pulverized coarsely and then charged from above the in-bath smelting furnace 94. Carbon material 86 (coal) was charged together with flux 87 (lime stone) from above the in-bath smelting furnace. The lime stone was used in such an amount so as to provide the basidity of slag at 1.25.

Molten iron was discharged together with slags from a tap hole disposed to a lower portion of the furnace.

A portion of the exhaust gas 31 from the in-bath smelting furnace 94 was used as fuel used in the rotary hearth furnace 11, while other portions were recovered as fuel for other facilities.

The test was conducted on four cases shown in Table 13.

TABLE 13

| Furnace | Item | | Case 1 | Case 2 | Case 3 | Case 4 |
|---|---|---|---|---|---|---|
| Preliminary reduction furnace | Placing of mixture on the preliminary reduction furnace hearth | | Pellet used | Sheet-like compact | Sheet-like compact | Sheet-like compact |
| | Powder solid reductant, laid thinly on hearth | | — | — | Practiced | — |
| | Unevenness formed on the uppersurface of the sheet-like compact | | — | — | — | Practiced |
| | Ore | (kg/pt) | 1436 | 1436 | 1436 | 1436 |
| | Air preheating temperature | (° C.) | 600 | 600 | 600 | 600 |
| | Amount of air | ($Nm^3$/pt) | 2145 | 2145 | 2145 | 2144 |
| | Amount of smelting furnace exhaust gas used | ($Nm^3$/pt) | 538 | 538 | 538 | 538 |
| | Reduction time in preliminary reduction furnace | (min) | 10 | 15 | 15 | 15 |
| | Metallizing ratio of reduced iron | (%) | 92.0 | 92.0 | 92.0 | 91.8 |
| | Reduced iron discharging temp. | (° C.) | 1150 | 1150 | 1150 | 1150 |
| | Securing of Reduced iron to hearth | | Scured slighly | Scured slighly | Not at all | Scured slighly |
| Smelting furnace | Reduced iron discharging temp. | (° C.) | 800 | 800 | 800 | 800 |
| | Coat | | 282 | 282 | 282 | 283 |
| | Oxygen | ($Nm^3$/pt) | 282 | 282 | 282 | 283 |
| | Molten iron temperature | (° C.) | 1500 | 1500 | 1500 | 1500 |
| | Molten iron [C] | (%) | 4.0 | 4.0 | 4.0 | 4.0 |
| | Molten iron [S] | (%) | 0.05 | 0.05 | 0.05 | 0.05 |
| | Slag | (kg/pt) | 177 | 177 | 177 | 177 |
| | Slag basidity | (—) | 1.25 | 1.25 | 1.25 | 1.25 |

Case 1 indicates a test in a case of pelletting a raw material mixture by an existent method in which the reduction time in the rotary hearth furnace was 10 min.

Case 2 shows an example of compacting the raw material mixture into a sheet-like shape and it was confirmed that reduced iron of 92% metallizing ratio was obtained if the reduction time was set to about 15 min. This shows that the reduction time may be extremely shorter compared with about 8 to 10 hours of reduction time in a case of a shaft furnace type direct reduction system using reduction gas obtained by modifying usual natural gas.

Case 3 is an example in which a sheet-like compact was disposed on the powder solid reductant laid thinly on the hearth and then put to high temperature reduction. While it was observed that reduced iron was slightly adhered on the hearth in other cases, adhesion of reduced ore was not observed at all.

Case 4 show an example in which the upper surface of the sheet-like compact was made uneven as shown in FIG. 3. While the metallizing ratio and the reduction time were substantially identical with those in case 2, since the amount of the raw material loaded per unit area of the hearth was increased by about 1.9 times, it was confirmed that the productivity was increased also to about 1.9 times. This is considered to be attributable to the increase of the heat receiving area due to the unevenness formed on the upper surface of the sheet-like compact and to the improvement of the temperature elevation rate since the protruded portions are heated from both surfaces although the amount of the raw material powder loaded per unit area of the hearth was increased to about 1.9 times.

In any of the cases 1–4 above, reduced iron at about 800° C. was charged into the in-bath smelting furnace thereby enabling to produce molten iron of good quality containing 4.0 wt % C and 0.05 wt % sulfur.

EXAMPLE 4

Powder iron ore shown in Table 14 and powder coal shown in Table 15 were used and blended in a blending ratio shown in Table 16, mixed and then compacted into a sheet-like shape of a size shown in the same table by a double roll compressor, charged in a rotary hearth furnace by way of a charging chote and baked into reduced iron. The specification for the facility of the rotary hearth furnace used and the operation conditions are shown in Table 17.

TABLE 14

| Powder iron raw material | | Chemical composition (mass %) | | | | | Grain size | |
|---|---|---|---|---|---|---|---|---|
| Kind | Brand | $Fe_2O_3$ | $SiO_2$ | $Al_2O_3$ | FeO | ZnO | −74 μm | −44 μm |
| Iron ore | Pellet feed MBR | 97.0 | 1.0 | 0.5 | 0.1 | 0.001 | 81% | 42% |

TABLE 15

| Powder solid reductant | | Chemical composition (mass %) | | | | | | Grain size | |
|---|---|---|---|---|---|---|---|---|---|
| Kind | Brand | C | H | $Fe_2O_3$ | $SiO_2$ | $Al_2O_3$ | VM | $-74\mu m$ | $-44\mu m$ |
| Coal | Woodland | 74.3 | 4.4 | 1.0 | 5.9 | 3.1 | 34.2 | 86% | 44% |

(Note)
VM : Volatile ingredient

TABLE 16

| Compacted raw material shape | Size | Water content after compaction (mass %) | Brand | Brending ratio (mass %) | Water content (mass %) |
|---|---|---|---|---|---|
| Sheet-like compact | 5 m (width) × 15 mm (thickness) | 11 | MBR | 77 | 8 |
| | | | Woodland | 21 | 9 |
| | | | Load tar | 2 | 0 |

TABLE 17

| Main specification for rotary hearth furnace | | Operation condition | |
|---|---|---|---|
| Effective outer diameter | 40 m | Speed of rotary hearth | 0.080 rpm |
| Effective inner diamete | 30 m | Furnace temperature | 1300° C. |
| Effective width | 5.0 m | Furnace combustion gas | LPG |
| Distance from furnace ceiling to hearth | 2.1 m | | |

Upon production of reduced iron, iron powder remaining on the hearth was removed by the method shown in case 1–case 6 in Table 18, or the remaining reduced iron powder on a hearth was prevented, and the effect of the present invention was evaluated based on the metallizing ratio of the obtained reduced iron. Case 1 shows an existent example in which the reduced iron was discharged by the screw feeder described above shown in FIG. 10 and then the operation was conducted without removing the reduced iron powder.

The metallizing ratio of the reduced iron in each of the cases is shown in Table 18, and the metallizing ratio of the reduced iron could be maintained higher in the examples of the present invention as compared with the existent examples. This is because the uneven combustion was reduced as a result of removing the reduced iron powder remaining on the hearth on every discharge of the reduced iron or as a result of preventing the residue of the reduced iron powder on the hearth.

EXAMPLE 5

The powder iron ore shown in Table 14 and the powder coal shown in Table 15 of Example 4 were used and blended in the blending ratios shown in Table 16, mixed and then compacted into sheet-like compacts of a size shown in the same table by a double roll compressor, charged in a rotary hearth furnace by way of a charging chute and baked into reduced iron. The specifications for the facility and the operation conditions of the rotary hearth furnace used are identical with those in Example 4.

The reduced iron was discharged by the methods shown in case 1–case 3 in Table 19 and the effect of the present invention was evaluated by the metallizing ratio of the obtained reduced iron.

TABLE 18

| | Reduced iron powder removing device | Specification for facility | | Metallizing ratio (%) | Remarks |
|---|---|---|---|---|---|
| Case 1 | non | — | | 85.6 | Existent Example |
| Case 2 | Gas jetting nozzle (FIG. 12) | Nozzle width Nozzle moving speed | : 5 m : 20 m/min | 93.1 | Example for the invention |
| Case 3 | Rotary type cleaning brush (FIG. 13) | Width of rotary cleaning brush group Moving speed of brush group | : 5 m : 20 m/min | 91.4 | Example for the invention |
| Case 4 | Reciprocating scraper (FIG. 14) | Scraper width Scraper moving speed | : 5 m : 20 m/min | 90.6 | Example for the invention |
| Case 5 | Suction food (FIG. 15) | Disposed in one row in the lateral direction of a hearth Suction port : width 5 m. length 0.3 m | | 94.5 | Example for the invention |
| Case 6 | Scraper type gate (FIG. 16) | Disposed in one row in the lateral direction of a hearth (Gate width 5 m, thickness 10 mm) Contact pressure (urging puressure) : 2 kgf/cm$^2$ | | 90.7 | Example for the invention |

TABLE 19

| | Discharging device | Specification for facility | | Metallizing ratio (%) | Remarks |
|---|---|---|---|---|---|
| Case 1 | Screw feeder | — | | 85.6 | Existent Example |
| Case 2 | Guide fennce (FIG. 11 c,d) | — | | 90.1 | Example for the invention |
| Case 3 | Pusher (FIG. 11 a,b) | Pusher width Pusher moving speed | : 5 m :20 m/min | 92.1 | Example for the invention |

The metallizing ratio of the reduced iron (average value) for each case is shown in Table 19. The metallizing ratio could be maintained at a high level in the examples of the present invention compared with existent examples. This is considered to be attributable to that the reduced iron did not remain on the hearth and reoxidation could be prevented in the examples of the present invention.

EXAMPLE 6

The powder iron ore shown in Table 14 and the powder coal shown in Table 15 of Example 4 were used and blended in the blending ratios shown in Table 16, mixed and then compacted into pellets or a sheet-like compacts shown in Table 20, charged in a rotary hearth furnace by way of a charging chute and baked into reduced iron. The specifications for the facility and the operation conditions of the rotary hearth furnace used are identical with those in Example 4, except for adjusting the speed of the rotary hearth furnace such that it took 9 min from charging charging of the raw material to discharge of products.

TABLE 20

| Shape of the compacted material | Size | Brand | Blending ratio (mass %) | Water content (mass %) |
|---|---|---|---|---|
| Pellet (with no binder) | 15 mm (spherical diameter) | MBR Woodland | 78 22 | 8 9 |
| Pellet (with binder) | 15 mm (spherical diameter) | MBR Woodland Bentnite | 77 21 2 | 8 9 0 |
| Sheet-like compact (with no binder) | 5 m (width) × 15 mm (thickness) | MBR Woodland | 78 22 | 8 9 |

A pellet of 15 mm diameter was prepared by using a pan type pelletizer of 7.5 m diameter in accordance with the production steps shown in FIG. 1, and charged into a rotary hearth furnace to produce reduced iron. The water content of the pellet after compaction was set to 11 mass %.

The metallizing ratio of the obtained reduced iron is shown for case A and case B in Table 21. Case A and Case B are examples of using a fretting mill used so far as a mixer (existent example).

Figure 20:
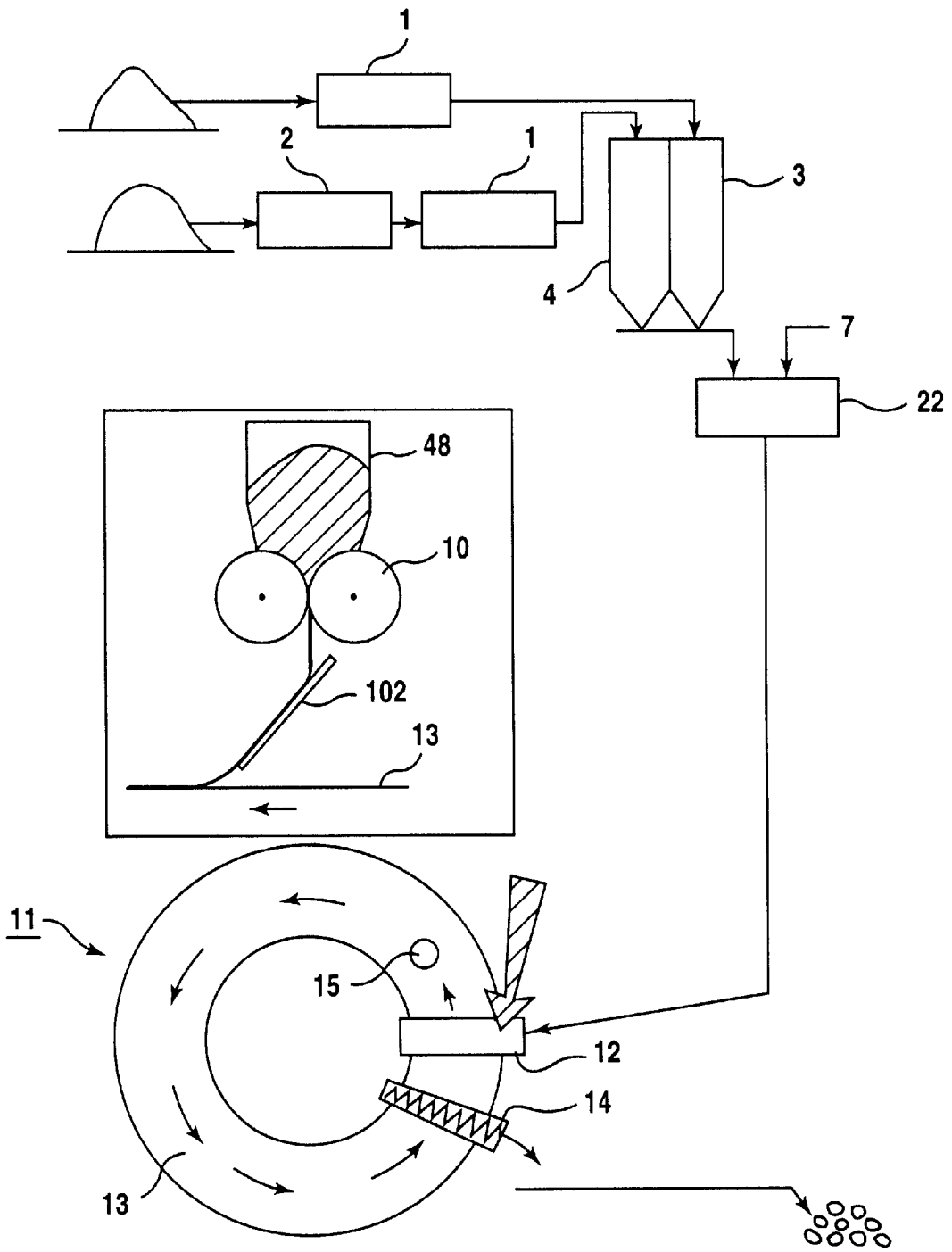
FIG. 20 is a schematic illustration of a method of mixing and feeding raw material according to an embodiment of the invention.

Reduced iron was produced in accordance with the production steps shown in FIG. 20, by using a high speed stirring mixer at a rotational speed of 300 rpm as a mixer 22, collectively mixing and processing powder iron ore 3, powder coal 4 and water 7 such that the water content of the raw material was settled constant at 11 mass %, compacted into a sheet-like shape by a double roll compressor 10 (shown in an enlarged scale) disposed just above the raw material charging section 12 of the rotary hearth furnace 11 and then charged by a charging chute 102 onto the rotary hearth furnace 13.

The metallizing ratio of the obtained reduced iron is shown for case C, case D1 and case D2 in Table 21. Case C is an example of using a fretting mill used so far as a mixer (examples of the invention), both of cases D1, D2 are examples of using a high speed stirring mixer (examples of the invention), D1 is an examples of using the powder coal as it is and D2 is a case of previously applying a drying treatment.

A higher metallization ratio is shown in the examples of the present invention using the high speed stirring mixer. Further, a higher metallization ratio was obtained in a case of previously applying the drying treatment to the powder coal.

Figure 21:
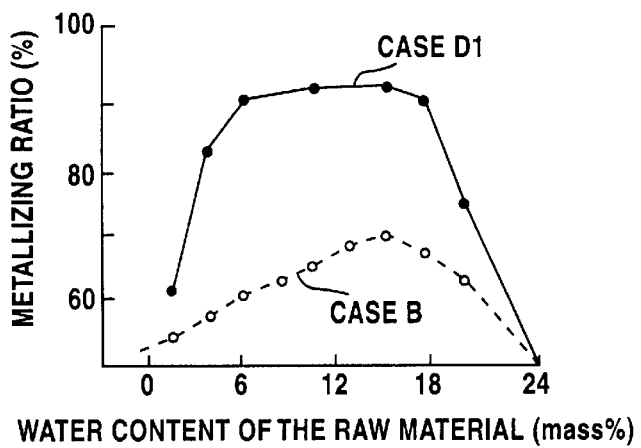
FIG. 21 is a graph showing relationship between water in raw material and metallization ratio based on the test results.

The relationship between the water content of the raw material and the metallizing ratio of the reduced iron is shown in FIG. 21. From the result, it can be seen that a high metallizing ratio was obtained at the water content of 6 to 18 mass % in Case D1.

TABLE 21

| | Molding machine | Binder | Water content in coal (mass %) | Mixer (rotaitional speed, rpm) | Metallizing ratio (%) | |
|---|---|---|---|---|---|---|
| Case A | Pelletizer | non | 9 | Fretting mill | 62 | Existent Example |
| Case B | Pelletizer | Bentnite | 9 | Fretting mill | 69 | Existent Example |
| Case C | Double roll | non | 9 | Fretting mill | 89 | Example for the invention |
| Case D1 | Double roll | non | 9 | High speed stirring mixer (300) | 94 | Example for the invention |
| Case D2 | Double roll | non | dried | High speed stirring mixer (300) | 98 | Example for the invention |

EXAMPLE 7

Powder iron ore shown in Table 22 and power coal shown in Table 23 were used for producing reduced iron under the conditions shown in Table 24. The metallizing ratio of the reduced iron in this case was determined and the effect of the present invention was evaluated.

TABLE 22

| Powder iron raw material | | Chemical composition (mass %) | | | | | Grain size |
| --- | --- | --- | --- | --- | --- | --- | --- |
| Kind | Brand | $Fe_2O_3$ | $SiO_2$ | $Al_2O_3$ | FeO | ZnO | −1 mm |
| Iron ore | Pellet feed MBR | 97.0 | 1.0 | 0.5 | 0.1 | 0.001 | 80% |
| Iron ore | Carajas | 96.2 | 0.5 | 0.8 | 0.1 | 0.001 | 43% |

TABLE 23

| Powder solid reductant | | Chemical composition (mass %) | | | | | | Grain size |
| --- | --- | --- | --- | --- | --- | --- | --- | --- |
| Kind | Brand | C | H | $Fe_2O_3$ | $SiO_2$ | $Al_2O_3$ | VM | −1 mm |
| Coal | Woodland | 74.3 | 4.4 | 1.0 | 5.9 | 3.1 | 34.2 | 13% |

(note)
VM : Volatile ingredient

TABLE 24

| Test item | Powder raw material | | Powder solid reductant | | Remark | |
| --- | --- | --- | --- | --- | --- | --- |
| Ingredient of powder iron ore ($Al_2O_3$ + $SiO_2$) altered test | Iron ore of various brand (grain size: $d_{50}$ = 60 μm) | 79% | Coal (Woodland) (grain size: $d_{50}$ = 60 μm) | 21% | Existent example: Bentnaite Iron ore (MBR) Coal (Woodland) (grain size: $d_{50}$ =60 μm) 60 μm) | 2% 77% 21% |
| Mixing test of power coal to fine powder iron ore | Iron ore (MBR) | 79% | Coal(Woodland) Water content | 21% 9% | | |

The reduced iron was manufactured in accordance with the production steps shown in FIG. 1 by shaping the raw material into sheet-like compacts by a double roll compressor having double rolls of 5.0 m diameter, charging then by a charging chote into a rotary hearth furnace and baking them. The specifications for the facility and the operation conditions of the rotary hearth used are identical with those in Example 6.

<Test of Changing Ingredients ($Al_2O_3$+$SiO_2$) of the Powder Iron Ore>

Powder iron ores of various brands having different contents for the total of $Al_2O_3$ and $SiO_2$, were used and the effect of the ingredients ($Al_2O_3$+$SiO_2$) contained in the powder iron ore on the metallizing ratio was investigated. For the comparison, the effect of the ingredient ($Al_2O_3$+$Si_2$) in a case of adding bentonite (clay) on the metallizing ratio was also investigated.

Figure 22:
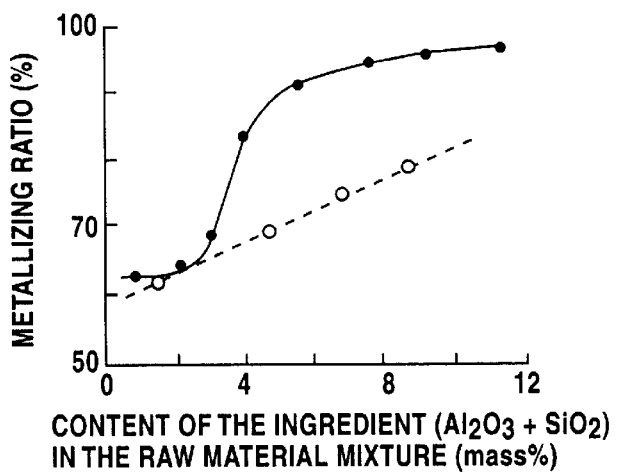
FIG. 22 is a graph showing relationship between content of $Al_2O_3+SiO_2$ in iron ore and metallization ratio based on the test results.

The results is shown in FIG. 22. In the figure, "●" shows a case of using powder iron ore having different contents of the ingredients ($Al_2O_3$+$SiO_2$), and "○" shows a case of varying the content of the ingredient ($Al_2O_3$+$SiO_2$) in the raw material mixture by adding bentonite.

As apparent from the result, when the content of the ingredient ($Al_2O_3$+$SiO_2$) was changed by changing the brand of the powder iron ore, the metallizing ratio of the reduced iron was increased abruptly when the content exceeds 4 mass %. On the contrary, when the content of the ingredient ($Al_2O_3$+$SiO_2$) was changed by adding bentonite (clay), the ratio was increased in proportion with the addition amount of bentonite but no abrupt increase was observed.

<Test of Mixing Powder Coal to Fine Powder Iron Ore>

The effect of the ratio of grains having the grain size of the coal (grain size: 0.1–1 mm ratio) on the metallizing ratio of the reduced iron was investigated by using fine powder iron ore in which 80% of grains being under 0.1 mm as the powder iron raw material (pellet feed MBR) and using coal with 9 mass % of water content as the powder solid reductant, and controlling the grain size by pulverizing the coal while controlling gaps by an impact mill pulverizer thereby changing the ratio of grains having the grain size from 0.1 to 1 mm (grain size: 0.1–1 mm ratio). conducted in the same manner also for a case of adding 15 parts by weight of iron ore (carajas) to 100 parts by weight of coal and mixing and pulverizing them under the same condition for the gap control by the impact mill pulverizer.

Figure 23:
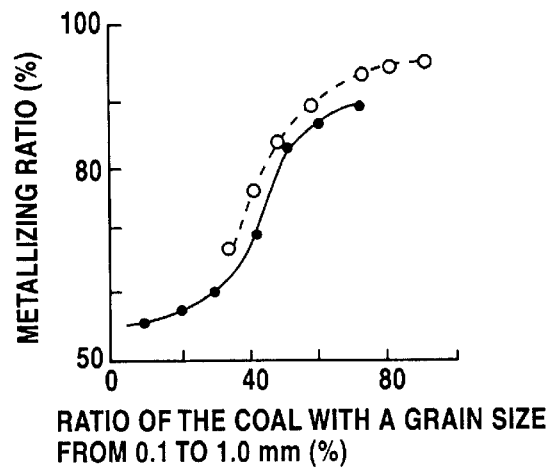
FIG. 23 is a graph showing relationship between ratio of fine particles between 0.1 and 1 mm in coal and metallization ratio based on the test results.

The result of the investigation is shown in FIG. 23. In the figure, "●" shows a case of pulverizing the coal alone and "○" shows a case of pulverizing the coal with addition of iron ore. In each of the cases, a high metallizing ratio was shown when the ratio of the coal with the grain size from 0.1 to 1.0 mm was not less than 50%.

Further, even when the pulverizing conditions of the impact mill were identical, deposition of the coal to the pulverizer was reduced, efficient pulverization was possible, the ratio of the coal with a grain size from 0.1 to 1.0 mm could be increased and a higher metallizing ratio was shown in a case of adding the iron ore and mixing and pulverizing the same ("○").

EXAMPLE 8

The powder iron ore and the powder coal having the composition and the grain size used in Example 4 were blended at a blending ratio shown in Table 25, mixed and then compacted into pellets or sheet-like compacts of the size shown in Table 25. Reduced iron was manufactured by using the compacted raw material under the conditions for case 1–case 3 shown in Table 26, and the productivity was determined to evaluate the effect of the present invention.

The specifications for the facility and the operation conditions of the rotary hearth used were identical with those in Example 4 except for controlling the rotary hearth speed such that the metallizing ratio of the products was 92%. That is, if the metallizing ratio of the reduced iron was lower than the aimed value (92%), the rotational speed was lowered and the baking time was extended to increase the metallizing ratio. In this case, the productivity was lowered. On the contrary, if the metallizing ratio was higher than the aimed value, the rotational speed was increased and the baking time was shortened to lower the metallizing ratio to the aimed value. In this case, the productivity was improved.

TABLE 25

| Shape of the compacted material | Size | Water content after compaction (mass %) | Brand | Blending ratio (mass %) | Water content (mass %) |
|---|---|---|---|---|---|
| Pellet | 20 mm (spherical diameter) | 11 | MBR<br>Woodland<br>Bentnite | 77<br>21<br>2 | 8<br>9<br>0 |
| Sheet-like compact | 5 m (width) × 15 mm (thickness) | 11 | MBR<br>Woodland<br>Road tar | 77<br>21<br>2 | 8<br>9<br>0 |

TABLE 26

| | Shape of raw material | Shape of charging shoot | Productivity (t/D · m²) | |
|---|---|---|---|---|
| Case 1 | Pellet | Plate shoot (raw material, shaped out of the furnace) | 1.05 | Existent Example |
| Case 2 | Sheet-lik compact | Curved shoot | 2.08 | Example for the invention |
| Case 3 | Sheet-lik compact | Top end shoot | 2.24 | Example for the invention |

Case 1 is an example of manufacturing pellets of 20 mm diameter by a customary method in accordance with the production steps shown in FIG. 1 by using a pan-like type pelletizer of 7.5 m diameter and charging the same by a plate-type in the rotary hearth furnace (existent example). Case 2 and Case 3 are examples of disposing a double roll compressor just above the raw material charging portion of the rotary hearth furnace, in which case 2 shows an example of charging the material by using the charging chute having a concaved top end and case 3 is an example of charging the pellet by using the top end chute connected at a hinge to the charging device.

As a result of comparison for the operations in each of the cases, since less impact force was exerted on the compacted raw material till they are charged to the hearth in the example of the present invention compared with the existent examples, the powder were less formed, undesired effect due to the deposition of the powder in the furnace was reduced and the productivity of the reduced iron was improved.

EXAMPLE 9

The powder iron ore and the powder coal having the composition and the grain size used in Example 4 were blended at a blending ratio shown in Table 27, mixed and then compacted into pellets or sheet-like compacts of the size shown in Table 27. Reduced iron was manufactured by using the compacted raw material under the conditions for case 1–case 5 shown in Table 28, and the productivity was determined to evaluate the effect of the present invention.

The specifications for the facility and the operation conditions of the rotary hearth used were identical with those in Example 4 except for controlling the rotary hearth speed such that the metallizing ratio of the products was 92%.

TABLE 27

| Shape of the compacted material | Size | Water content after compaction (mass %) | Brand | Blending ratio (mass %) | Water content (mass %) |
|---|---|---|---|---|---|
| Pellet | 20 mm (spherical diameter) | 11 | MBR<br>Woodland<br>Bentnite | 77<br>21<br>2 | 8<br>9<br>0 |
| Sheet-like compact | 5 m (width) × 15 mm (thickness) | 16 | MBR<br>Woodland | 78<br>22 | 8<br>9 |

TABLE 28

| | Shape of raw material | Shape of charging shoot | Film or belt | Productivity (t/D · m²) | |
|---|---|---|---|---|---|
| Case 1 | Pellet | (shaped out of the furnace) | — | 1.00 | Existent Example |
| Case 2 | Sheet-lik compact | FIG. 8(a) | Polyethylene of 0.1 mm thickness | 2.58 | Example for the invention |
| Case 3 | Sheet-lik compact | FIG. 8(a) | Paper of 30 g/m² | 2.54 | Example for the invention |
| Case 4 | Sheet-lik | FIG. 8(b) | Rubber belt of | 2.23 | Example for |

TABLE 28-continued

|  | Shape of raw material | Shape of charging shoot | Film or belt | Productivity (t/D · m²) |  |
|---|---|---|---|---|---|
| Case 5 | compact Sheet-lik compact | FIG. 8(b) | 10 mm thickness Steel of 1 mm thickness | 2.44 | the invention Example for the invention |

Case 1 is an example of manufacturing pellets of 20 mm diameter in the same manner as in Example 8 and charging them by a plate-type chote into a rotary hearth furnace.

Case 2 and Case 3 are examples of using the charging device shown in FIG. 8(a), compacting the raw material mixture and film together by a double-roll compressor into sheet-like compacts by placing the compressed raw material on the film, and placing the sheet-like compact together with the film on the hearth. As the film, polyethylene of 0.1 mm thickness and paper of 30 g/m2 were used. In this case, the thickness of the sheet-like compact charged on the hearth was made constant at 15 mm. Further, the rotational speed of the double-roll was set so as to synchronize with the moving speed of the hearth.

Case 4 and case 5 are examples of using the charging device shown in FIG. 8(b), compacting the raw material mixture and belt together by a double roll compressor into sheet-like compacts by placing the compacted raw material was placed on the belt, separating the belt and the sheet-like compact near the hearth and placing the sheet-like compact on the hearth. A rubber belt of 10 mm thickness was used as the belt in case 4, and a steel belt of 2 mm thickness was used as the belt in case 5. The thickness of the sheet-like compact and the control for the rotational speed of the double roll were identical with those in the case of using the film.

In the operation, the rotational speed of the hearth was controlled such that the metallizing ratio of the reduced iron was 92% like that in Example 8.

As a result of comparison for the operations in each of the cases, the raw material could be baked stably with no unevenness and the productivity for the reduced iron was improved in the examples of the present invention as compared with the existent example. This is because the raw material mixture could be charged at a high filling ratio in a sheet-like shape on the furnace.

EXAMPLE 10

The powder iron ore and the powder coal having the composition and the grain size used in Example 4 were blended at the blending ratio shown in Table 25 of Example 8, mixed and then compacted into pellets or sheet-like compacts of the size shown in Table 25. Reduced iron was manufactured by using the compacted raw material under the conditions for case 1–case 4 shown in Table 29, and the productivity was determined to evaluate the effect of the present invention. The specifications for the facility and the operation conditions of the rotary hearth used were identical with those in Example 4 except for controlling the rotary hearth speed such that the metallizing ratio of the products was 92%.

TABLE 29

|  | Shape of raw material | Disposing position of double roll compressor | Disposing position press roll | Productivity (t/D · m²) |  |
|---|---|---|---|---|---|
| Case 1 | Pellet | (shaped out of the furnace) | — | 1.05 | Ex. |
| Case 2 | Sheet-lik compact | Above the raw material charging portion (single unit) | Upstream to the rotary hearth | 2.08 | Iv. |
| Case 3 | Sheet-lik compact | Above the raw material charging portion (single unit) | Upstream to the rotary hearth | 2.24 | Iv. |
| Case 4 | Sheet-lik compact | Above the raw material charging portion (three units in parallel) | Upstream to the rotary hearth | 2.33 | Iv. |

(Note)
"Ex." means Existent example, and "Iv." means Example for the invention

Case 1 is an example of manufacturing pellets of 20 mm diameter like that in Example 8 and charging them by a plate type shoot to a rotary hearth.

Case 2 and case 4 are examples of compacting into a sheet-like shape. In case 2, a single double-roll compressor of 5 m width was disposed just above the raw material charging portion of the rotary hearth, a roll on the side of compression and pressing was disposed at the upstream to the rotary hearth and a fixed roll with no pressure was disposed at the downstream to the rotary moving hearth. On the contrary, in case 3, the roll on the side of compression and pressing of the double-roll compressor was disposed at the downstream to the rotary moving hearth, while the fixed roll with no pressure was disposed at the upstream to the rotary moving hearth. The double-roll compressor used was identical (5 m width, single unit).

Case 4 is an example of disposing three double-roll compressors of 1.67 mm width in the lateral direction of the rotary hearth furnace in which a roll on the side of compression and pressing of the double roll was disposed at the downstream to the rotary moving hearth, while the fixed roll with no pressing was disposed at the upstream to the rotary moving hearth.

In operation, like that in Example 8, the rotational speed of the hearth was controlled such that the metallizing ratio of the reduced iron was 92%.

As a result of comparison for the operation in each of the cases, since less impact shock was exerted till the charging to the hearth, the powder was less caused, the undesired effect due to the deposition of the powder in the hearth was reduced and the productivity of the reduced iron was improved. Particularly, in a case of disposing the pressing roll of the double-roll compressor at the downstream in the moving direction of the rotary hearth, and in a case of disposing a plurality of double roll compressors with a shortened roll length, a higher effect of improving the productivity was obtained.

Industrial Applicability

As has been described above, according to the method of manufacturing the reduced iron of the present invention, since the sheet-like compact can be obtained merely by shaping the raw material mixture with roller or the like, the processing time is extremely shorter compared with a case of granulation such as pelletization and the operation and maintenance for the device used for the shape are also easy. In addition, while pellets are insufficient in the strength as they are granulated and the strength has to be increased by drying, the sheet-like compacts are not collapsed even not by way of the drying step by merely placing by way of a support roller or a charging chute on a hearth. If they are exposed to a high temperature in the furnace to suffer from more or less crackings, it does not lead to collapse and gives no troubles in the reduction. This method can be practiced easily by using the device for manufacturing the reduced iron according to the present invention described above.

Further, the reduced iron obtained by the method described above can be charged at a high temperature state into a shaft furnace or an in-bath smelting furnace and melted at a high heat efficiency, to produce molten iron of good quality.

What is claimed is:

1. A method of producing reduced iron from fine iron oxides, comprising the steps of a) through d) as follows:
   a) obtaining raw material mixture by mixing fine iron oxides and powdery solid reductants with water or at least one kind of binder, singly or in combination;
   b) compacting the raw material mixture into compacted sheet by a double roller;
   c) placing the compacted sheet on a horizontally rotatable hearth of a reduction furnace; and
   d) reducing iron oxides by blowing fuel and oxygen containing gas into a reduction furnace, and burning the fuel, combustible volatile constituents issued from the powdery solid reductants and the CO gas generated as a result of reduction of the iron oxides by the agency of the powdery solid reductants, so that a temperature inside the furnace is maintained at not less than 1100° C.

2. A method of producing reduced iron from fine iron oxides according to claim 1, wherein the compacted sheet has projections on a surface opposite to a surface facing the horizontally rotatable hearth.

3. A method of producing reduced iron from fine iron oxides according to claim 1, wherein iron oxides are reduces by burning combustible volatile constituents issued from the solid reductants contained in the compacted sheet by blowing oxygen-containing gas onto the surface of the compacted sheets until issuing of the combustible volatile constituents from the solid reductants substantially ceases, and by maintaining a temperature inside the furnace at not less than 1100° C. after issuing of the combustible volatile constituents from the solid reductants has ceased.

4. A method of producing reduced iron from fine iron oxides according to claim 1, wherein the compacted sheet is placed on top of the powdery solid reductants laid on the horizontally rotatable hearth of the reduction furnace.

5. A method of producing reduced iron from fine iron oxides according to claim 1, wherein the raw material mixture is compacted by a double-roll compactor as a double roller, disposed above the hearth such that axes of the double rolls intersect the direction of the advance of the hearth at right angles, the compacted sheet discharged from the double-roll compactor being received by a feeder chute, and placed on the hearth.

6. A method of producing reduced iron from fine iron oxides according to claim 5, wherein the double-roll compactor is divided into a plurality of double-roll compactors disposed in the direction crossing the direction of advance of the horizontally rotatable hearth at right angles, and across the entire width of the horizontally rotatable hearth.

7. A method of producing reduced iron from fine iron oxides according to claim 5, wherein the feeder chute has a part thereof concavely curved in a longitudinal section along the direction of advance of the furnace.

8. A method of producing reduced iron from fine iron oxides according to claim 5, wherein the feeder chute is a tip chute detachable, and attached rotatably around a connection point as a fulcrum, having the extremity thereof in contact with the horizontally rotatable hearth.

9. A method of producing reduced iron from fine iron oxides according to claim 1, wherein the raw material mixture is compacted by a double-roll compactor as a double roller, disposed above the rotary hearth and provided with two rolls such that the axes of the rolls intersect the direction of advance of the horizontally rotatable hearth at right angles, into the compacted sheet via a thin film in intimate contact with either one of the rolls, and the compacted sheet is placed on the horizontally rotatable hearth together with the film.

10. A method of producing reduced iron from fine iron oxides according to claim 1, wherein the raw material mixture is compacted by a double-roll compactor as a double roller, disposed above the horizontally rotatable hearth and provided with two rolls such that the axes of the rolls intersect the direction of advance of the horizontally rotatable hearth at right angles, in to the compacted sheet via a belt in intimate contact with either one of the rolls, the compacted sheet transferred together with the belt to a position in close proximity of the horizontally rotatable hearth, separated from the belt, and placed on the horizontally rotatable hearth with the belt returning to the double roll compactor.

11. A method of producing reduced iron from fine iron oxides according to claim 1, wherein the raw material mixture is supplied onto a tilted chute constituted by a belt circulating in the direction of advance of the horizontally rotatable hearth, and compacted into the compacted sheet by the double roller, the compacted sheet on the belt being transferred to a position in close proximity of the horizontally rotatable hearth, separated from the belt for further transfer onto a feeder chute, and placed on the horizontally rotatable hearth.

12. A method of producing reduced iron from fine iron oxides according to claim 11, wherein a supplementary transfer belt, constituted by a belt circulating in the direction of advance of the horizontally rotatable hearth, is kept in contact with the surface of the compacted sheet transferred to the feeder chute to place the compacted sheet on the horizontally rotatable hearth by the agency of driving force of the belt.

13. A method of producing reduced iron from fine iron oxides according to claim 1, wherein all of the fine iron oxides, powdery solid reductants, water, and a binder to be added as necessary, are all fed together into a mixer incorporating high speed agitation impellers rotating at not less than 300 rpm, adjusting mixing so that a proportion of water to all raw materials become 6 to 18 mass %, and a mixture obtained is compacted into compacted sheet.

14. A method of producing reduced iron from fine iron oxides according to claim 1, wherein fine iron oxides containing 4.0 to 10.0% by mass of $Al_2O_3$ and $SiO_2$ in total are used for material.

15. A method of producing reduced iron from fine iron oxides according to claim 1, wherein fine iron oxides containing not less than 80% by mass of fines less than 0.1 mm in size, and coal, as powdery solid reductants, containing not less than 6% by mass of water, and not less than 50% by mass of coal fines not less than 0.1 mm and not more than 1 mm in diameter are used.

16. A method of producing reduced iron from fine iron oxides according to claim 1, wherein reduced iron is discharged by a pushout device reciprocatingly movable in the direction at right angles to the direction of advance of the horizontally rotatable hearth.

17. A method of producing reduced iron from fine iron oxides according to claim 1, wherein reduced iron is discharged towards both sides of the horizontally rotatable hearth along a discharge guide fence provided on the producing reduced iron from fine iron oxides according to the horizontally rotatable hearth, and formed in the shape resembling the letter V based at the center across the horizontally rotatable hearth, and spread in the direction of advance of the horizontally rotatable hearth.

18. A method of producing reduced iron from fine iron oxides according to claim 1, wherein reduced iron fines remaining on the hearth are removed from the surface thereof by blowing off with injected gas flow between the reduced iron discharge area and the raw material feeding inlet.

19. A method of producing reduced iron from fine iron oxides according to claim 1, wherein reduced iron fines remaining on the horizontally rotatable hearth is removed by sweeping the surface thereof between the reduce iron discharge area and the raw material feeding inlet with brooms, each provided with rotatable feather.

20. A method of producing reduced iron from fine iron oxides according to claim 1, wherein the reduced iron fines and adhesive matter are removed by scraping same off with a scraper reciprocatingly movable in the direction crossing the direction of advance of the horizontally rotatable hearth between the reduced iron discharge area and the raw material feeding inlet, the lower edge thereof being kept in touch with the horizontally rotatable hearth.

21. A method of producing reduced iron from fine iron oxides according to claim 1, wherein reduced iron fines remaining on the horizontally rotatable hearth is removed from the surface of the horizontally rotatable hearth by sucking same in through a suction hood provided between the reduced iron discharge area and the raw material feeding inlet.

22. A method of producing reduced iron from fine iron oxides according to claim 1, wherein reduced iron fines are prevented from remaining on the hearth by a scraper type gate with the lower end thereof kept in contact with the horizontally rotatable hearth and installed immediately behind the fixed stopper fence installed in the reduced iron discharge area.

23. A method of producing hot metal from fine iron oxides, comprising the steps of a) through g) as follows:
    a) obtaining raw material mixture by mixing fine iron oxides and powdery solid reductants with water or at least one kind of binder, singly or in combination;
    b) compacting the raw material mixture into compacted sheet by a double roller;
    c) placing the compacted sheet on the horizontally rotatable hearth of a pre-reduction furnace; and
    d) pre-reducing iron oxides by blowing fuel and oxygen-containing gas into the pre-reduction furnace, and burning the fuel, combustible volatile constituents issued from the powdery solid reductants and the CO gas generated as a result of reduction of the iron oxides by the agency of the powdery solid reductants, so that a temperature inside the furnace is maintained at not less than 1100° C.;
    e) discharging the reduced iron obtained through the condition discharged through the discharge step described above, by charging the reduced iron together with carbon material and flux into a shaft furnace from the upper part thereof, having a carbon material bed therein, and tuyeres in the lower part thereof for oxygen containing gas blown in therethrough to combust tuyeres in the lower part thereof for oxygen containing gas blown in therethrough to combust the carbon material disposed in front thereof, generating reducing gas at a high temperature, so that hot metal and molten slag are discharged through a tap hole provided in the lower part of the shaft furnace; and
    g) recovering off-gases generated in the shaft furnace, and recycling a part of the off-gases into the pre-reduction furnace for use as a fuel for pre-reduction.

24. A method of producing hot metal from fine iron oxides, comprising the steps of a) through g) as follows:
    a) obtaining raw material mixture by mixing fine iron oxides and powdery solid reductants with water or at least one kind of binder, singly or in combination;
    b) compacting the raw material mixture into compacted sheet by a double roller;
    c) placing the compacted sheet on the horizontally rotatable hearth of the pre-reduction furnace; and
    d) reducing iron oxide by blowing fuel and oxygen-containing gas into the pre-reduction furnace, and burning the fuel, combustible volatile constituents issued from the powdery solid reductants and the CO gas generated as a result of reduction of the iron oxides by the agency of the powdery solid reductants, so that a temperature inside the furnace is maintained at not less than 1100° C.;
    e) discharging the reduced iron obtained through the pre-reduction step from the pre-reduction furnace at a temperature not less than 500° C.;
    f) reducing and melting the reduced iron in a hot condition discharged through the discharge step described above, by charging the reduced iron together with carbon material and flux into a in-bath smelting furnace from the upper part thereof, the in-bath smelting furnace having molten metal bath and molten slag bath therein, and through the bottom of which gas for agitation is blown into the molten metal bath for stirring up the molten metal bath and molten slag bath while oxygen is blown therein to from the upper part thereof, so that hot metal and molten slag are discharged through a tap hole provided in the lower part of the in-bath smelting furnace; and
    g) recovering off-gases generated in the in-bath smelting furnace, and recycling a part of the off-gases into the pre-reduction furnace for use as a fuel for pre-reduction.

25. A method of producing hot metal according to claim 23, wherein water or at least one kind of binder, singly or in combination, is added to fine iron oxides being mixed with powdery solid reductants.

26. A method of producing hot metal according to claim 24, wherein water or at least one kind of binder, singly or in combination, is added to fine iron oxides being mixed with powdery solid reductants.

27. A method of producing hot metal according to claim 23, wherein the compacted sheet has projections on a surface opposite to a surface facing the horizontally rotatable hearth.

28. A method of producing hot metal according to claim 24, wherein the compacted sheet has projections on a surface opposite to a surface facing the horizontally rotatable hearth.

29. A method of producing hot metal according to claim 23, wherein iron oxides are reduced by burning combustible volatile constituents issued from the solid reductants contained in the compacted sheets by blowing oxygen-containing gas onto the surface of the compacted sheets until issuing of the combustible volatile constituents from the solid reductants substantially ceases, and by maintaining a temperature inside the furnace at not less than 1100° C. after issuing of the combustible volatile constituents from the solid reductants has ceased.

30. A method of producing hot metal according to claim 24, wherein iron oxides are reduced by burning combustible volatile constituents issued from the solid reductants contained in the compacted sheets by blowing oxygen-containing gas onto the surface of the compacted sheets until issuing of the combustible volatile constituents from the solid reductants substantially ceases, and by maintaining a temperature inside the furnace at not less than 1100° C. after issuing of the combustible volatile constituents from the solid reductants has ceased.

31. A method of producing hot metal according to claim 23, wherein the compacted sheet is placed on top of the powdery solid reductants laid on the horizontally rotatable hearth of the pre-reduction furnace.

32. A method of producing hot metal according to claim 24, wherein the compacted sheet is placed on top of the powdery solid reductants laid on the horizontally rotatable hearth of the pre-reduction furnace.

* * * * *